United States Patent
Sedin et al.

(10) Patent No.: US 12,457,638 B2
(45) Date of Patent: Oct. 28, 2025

(54) TWO-STEP RANDOM ACCESS

(71) Applicant: Telefonaktiebolaget LM Ericsson (publ), Stockholm (SE)

(72) Inventors: Jonas Sedin, Sollentuna (SE); Zhipeng Lin, Nanjing (CN); Johan Rune, Lidingö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 387 days.

(21) Appl. No.: 17/793,756

(22) PCT Filed: Jan. 19, 2021

(86) PCT No.: PCT/EP2021/051080
§ 371 (c)(1),
(2) Date: Jul. 19, 2022

(87) PCT Pub. No.: WO2021/148412
PCT Pub. Date: Jul. 29, 2021

(65) Prior Publication Data
US 2023/0054655 A1    Feb. 23, 2023

(30) Foreign Application Priority Data

Jan. 20, 2020   (EP) ..................................... 20152765

(51) Int. Cl.
| | | |
|---|---|---|
| *H04W 74/04* | (2009.01) | |
| *H04W 74/00* | (2009.01) | |
| *H04W 74/0833* | (2024.01) | |
| *H04W 74/0836* | (2024.01) | |
| *H04W 74/0838* | (2024.01) | |

(52) U.S. Cl.
CPC ......... *H04W 74/04* (2013.01); *H04W 74/004* (2013.01); *H04W 74/0836* (2024.01); *H04W 74/0838* (2024.01); *H04W 74/0833* (2013.01)

(58) Field of Classification Search
CPC .. H04W 74/0833; H04W 76/10; H04W 72/04
See application file for complete search history.

(56) References Cited

U.S. PATENT DOCUMENTS

| | | | |
|---|---|---|---|
| 2020/0305202 A1* | 9/2020 | Zhang | .................... H04W 72/04 |
| 2020/0383167 A1* | 12/2020 | Sengupta | .............. H04B 7/0617 |
| 2021/0100029 A1* | 4/2021 | Lei | ..................... H04W 74/0833 |

(Continued)

OTHER PUBLICATIONS

International Search Report and Written Opinion dated Apr. 15, 2021 for International Application No. PCT/EP2021/051080 filed Jan. 19, 2021; consisting of 15 pages.

(Continued)

*Primary Examiner* — Mahran Y Abu Roumi
(74) *Attorney, Agent, or Firm* — Weisberg I.P. Law, P.A.

(57) ABSTRACT

A UE is provided with a dedicated preamble for use in a two-step random access procedure, as well as dedicated, contention-free PUSCH transmission resources for the PUSCH part of msgA. In one embodiment, the base station transmits a partial PUSCH msgA configuration to the UE using dedicated RRC signaling. In another embodiment, the base station transmits a resource index to the UE indicative of a dedicated PUSCH resource for a msgA transmission via dedicated RRC signaling.

14 Claims, 31 Drawing Sheets

(56) References Cited

U.S. PATENT DOCUMENTS

2021/0410182 A1* 12/2021 Zhang ................. H04L 5/0048
2022/0400396 A1* 12/2022 Alfarhan ............... H04W 72/20

OTHER PUBLICATIONS

3GPP TSG-RAN WG2 # 107 R2-1910670; Title: Discussion on the MsgA resource configuration; Agenda Item: 11.13.4; Source: Huawei, HiSilicon; Document for: Discussion, Decision; Date and Location: Aug. 26-30, 2019, Prague, CR; consisting of 6 pages.

3GPP TSG RAN WG1 #96 R1-1902466; Title: Channel structure for two-step RACH; Source: Intel Corporation; Agenda item: 7.2.1.1; Document for: Discussion and decision; Date and Location: Feb. 25-Mar. 1, 2019, Athens, Greece; consisting of 8 pages.

3GPP TSG RAN WG1 #97 R1-1906746; Title: On 2-step RACH Channel Structure; Agenda Item: 7.2.1.1; Source: Nokia, Nokia Shanghai Bell; Document for: Discussion and Decision; Date and Location: May 13-17, 2019, Reno, USA; consisting of 16 pages.

3GPP TSG-RAN WG1 Meeting #96Bis R1-1904993; Title: Procedures for Two-Step RACH; Agenda item: 7.2.1.2; Source: Qualcomm Incorporated; Document for: Discussion and Decision; Date and Location: Apr. 8-12, 2019, Xi'an, China; consisting of 12 pages.

3GPP TSG RAN Meeting #82 RP-182894; Title: New work item: 2-step RACH for NR; Source: ZTE Corporation, Sane chips; Document for: Approval: Agenda Item: 9.1.1; Date and Location: Dec. 10-13, 2018, Sorrento, Italy; consisting of 5 pages.

3GPP TSG RAN Meeting #85 RP-192330 revision of RP-190711; Title: Revised work item proposal: 2-step RACH for NR; Source: ZTE Corporation; Document for: Approval; Agenda Item: 9.4.4; Date and Location: Sep. 16-20, 2019, Newport Beach, USA; consisting of 5 pages.

Japanese Office Action and English Summary dated Aug. 25, 2023 for Application No. 2022-543785, consisting of 16 pages.

3GPP TSG-RAN WG2 #108 R2-1915216; Title: Discussion on 2-step CFRA; Agenda Item: 6.13.4; Source: CMCC; Document for: Discussion; Location and Date: Reno, USA, Nov. 18-22, 2019, consisting of 5 pages.

3GPP TSG-RAN WG2 RAN2 #107bis Tdoc R2-1912680; Title: Configuration of 2-step RA; Agenda Item: 6.13.4; Source: Ericsson; Document for: Discussion, Decision; Location and Date: Chongqing, China, Oct. 14-18, 2019, consisting of 11 pages.

3GPP TSG-RAN WG1 Meeting #99 R1-1912255; Title: Discussion on Channel Structure for 2-step RACH; Source: Asia Pacific Telecom; Agenda Item: 7.2.1.1; Document for: Discussion and Decision; Location and Date: Reno, USA, Nov. 18-22, 2019, consisting of 6 pages.

EPO Communication dated Feb. 7, 2024 for Patent Application No. 21701118.8, consisting of 8 pages.

3GPP TSG-RAN WG2 #108 R2-1915216; Title: Discussion on 2-step CFRA; Agenda Item: 6.13.4; Source: CMCC; Document for: Discussion; Date and Location: Nov. 18-22, 2019, Reno, USA, consisting of 3 pages.

3GPP TSG-RAN2 Meeting #108 R2-1914800; Title: Support of CFRA with 2-step RACH; Agenda Item: 6.13.4; Source: ZTE Corporation, Sanechips, Vivo, Oppo, Fujitsu, Qualcomm, InterDigital, Intel; Document for: Discussion and Decision; Date and Location: Nov. 18-22, 2019, Reno, USA, consisting of 8 pages.

* cited by examiner

TWO-STEP RANDOM ACCESS

CROSS-REFERENCE TO RELATED APPLICATIONS

This application is a Submission Under 35 U.S.C. § 371 for U.S. National Stage Patent Application of International Application No.: PCT/EP2021/051080, filed Jan. 19, 2021 entitled "TWO-STEP RANDOM ACCESS," which claims priority to European Application No.: EP20152765.2, filed Jan. 20, 2020, the entireties of both of which are incorporated herein by reference.

TECHNICAL FIELD

The present disclosure relates generally to random access procedures for wireless communication networks and, more particularly, to a two-step, contention-free random access procedure for use during handovers and cell group changes.

BACKGROUND

Two-step random access is being considered for New Radio (NR) networks. Essentially, the two-step random access procedure combines Message 1 (msg1) and Message 3 (msg3) of the standard four-step random access procedure into a single message, labeled Message A (msgA) in a first step of the random access procedure. msgA thus contains a random access preamble transmitted on Physical Random Access Channel (PRACH) transmission resources combined with a transmission of the remainder of msgA (corresponding to msg3) on PUSCH transmission resources. The transmission of msgA in the first step is followed by a second, concluding step comprising the transmission of a message, labeled Message B (msgB), that combines Message 2 (msg2) and Message 4 (msg4) of the standard for-step random access procedure.

The two-step random access procedure has similar properties as RACH-less handover in that the payload (which may be user plane data or the content of a Radio Resource Control (RRC) message) can be transmitted in a first step (i.e., without having to wait a typical Round Trip Time (RTT) after transmission of a random access preamble and reception of a random access response (RAR)). Hence, handover with two-step random access applied in the target cell is an option, along with RACH-less handover, when the goal is to reduce the handover interruption. Two-step random access also has the advantage that it contains a preamble transmission, which allows the base station (e.g., gNB or eNB) to estimate a proper timing advance (TA) for the UE 120. It may also be advantageous in other use cases where a fast setup is also important to better utilize network resources such as in Secondary Cell Group (SCG) addition, SCG changes, Secondary Cell (SCell) addition, etc.

The two-step random access can be a contention-based random access (CBRA) or a contention-free random access (CFRA). Because CFRA is the commonly preferred random access variant when a UE accesses the target cell in conjunction with a handover or SCG change (or SCG addition, or SCell addition, etc.), support for CFRA is needed to make two-step random access an attractive option when compared to RACH-less handover to be implemented by a network vendor. In addition, even if a UE were to use a contention-free random access preamble (i.e., unique preamble), as is the case in a CFRA procedure, this would only ensure that the UE can avoid preamble collisions, but the PUSCH part of msgA could still have the risk of collision with msgA transmissions from other UEs due to lack orthogonality.

SUMMARY

The present disclosure relates generally to a two-step, contention-free random access procedure. According to one aspect of the disclosure, a user equipment (UE) is provided with a dedicated preamble for use in a two-step random access procedure, as well as dedicated, contention-free PUSCH transmission resources for the PUSCH part of msgA. The latter may be provided in the form of a dedicated preamble to PUSCH transmission resource mapping, or in the form of a plain PUSCH transmission resource allocation/indication.

A first aspect of the disclosure comprises random access methods implemented by a user equipment in a wireless communication network. In one embodiment, the method comprises receiving a partial Physical Uplink Shared Channel (PUSCH) resource configuration for a Message A (msgA) transmission including a dynamic part of the PUSCH resource configuration for the msgA transmission. The method further comprises transmitting, to a base station, the preamble of msgA, and transmitting, to the base station, the PUSCH message of msgA using PUSCH resources indicated by the dynamic part of the PUSCH resource configuration.

A second aspect of the disclosure comprises a UE in a wireless communication network. The UE is configured to receive a partial Physical Uplink Shared Channel (PUSCH) resource configuration for a Message A (msgA) transmission including a dynamic part of the PUSCH resource configuration for the msgA transmission. The UE is further configured to transmit, to a base station, the preamble of msgA, and to transmit, to the base station, the PUSCH message of msgA using PUSCH resources indicated by the dynamic part of the PUSCH resource configuration.

A third aspect of the disclosure comprises a user equipment having communication circuitry for communicating with a base station and processing circuitry. The processing circuitry is configured to receive a partial Physical Uplink Shared Channel (PUSCH) resource configuration for a Message A (msgA) transmission including a dynamic part of the PUSCH resource configuration for the msgA transmission. The processing circuitry is further configured to transmit, to a base station, the preamble of msgA, and to transmit, to the base station, the PUSCH message of msgA using PUSCH resources indicated by the dynamic part of the PUSCH resource configuration.

A fourth aspect of the disclosure comprises a computer program for a UE in a communication network. The computer program comprises executable instructions that, when executed by processing circuitry in the UE, causes the UE to receive a partial Physical Uplink Shared Channel (PUSCH) resource configuration for a Message A (msgA) transmission including a dynamic part of the PUSCH resource configuration for the msgA transmission. The computer program further causes the UE to transmit, to a base station, the preamble of msgA and to transmit, to the base station, the PUSCH message of msgA using PUSCH resources indicated by the dynamic part of the PUSCH resource configuration.

A fifth aspect of the disclosure comprises a carrier containing a computer program according to the fourth aspect. The carrier is one of an electronic signal, optical signal, radio signal, or a non-transitory computer readable storage medium.

A sixth aspect of the disclosure comprises methods implemented by a base station in a wireless communication network of supporting random access. In one embodiment, the method comprises transmitting a partial Physical Uplink Shared Channel (PUSCH) resource configuration for a Message A (msgA) transmission including a dynamic part of the PUSCH resource configuration for the msgA. The method further comprises receiving, from the UE on the PRACH, the preamble of msgA on the PRACH. The further comprises receiving, from the UE on the PUSCH, the PUSCH message of msgA using PUSCH resources indicated by the dynamic part of the PUSCH resource configuration.

A seventh aspect of the disclosure comprises a base station configured to support two-step random access. The base station is configured to transmit a partial Physical Uplink Shared Channel (PUSCH) resource configuration for a Message A (msgA) transmission including a dynamic part of the PUSCH resource configuration for the msgA. The base station is further configured to receive, from the UE on the PRACH, the preamble of msgA on the PRACH. The base station is further configured to receive, from the UE on the PUSCH, the PUSCH message of msgA using PUSCH resources indicated by the dynamic part of the PUSCH resource configuration.

An eighth aspect of the disclosure comprises a base station having communication circuitry for communicating with a UE and processing circuitry configured to support two-step random access. The processing circuitry is configured to transmit a partial Physical Uplink Shared Channel (PUSCH) resource configuration for a Message A (msgA) transmission including a dynamic part of the PUSCH resource configuration for the msgA. The processing circuitry is further configured to receive, from the UE on the PRACH, the preamble of msgA on the PRACH. The processing circuitry is further configured to receive, from the UE on the PUSCH, the PUSCH message of msgA using PUSCH resources indicated by the dynamic part of the PUSCH resource configuration.

A ninth aspect of the disclosure comprises a computer program for a base station in a communication network configured to support two-step random access. The computer program comprises executable instructions that, when executed by processing circuitry in the base station, causes the base station to transmit a partial Physical Uplink Shared Channel (PUSCH) resource configuration for a Message A (msgA) transmission including a dynamic part of the PUSCH resource configuration for the msgA. The computer program further causes the base station to receive, from the UE on the PRACH, the preamble of msgA on the PRACH. The computer program further causes the base station to receive, from the UE on the PUSCH, the PUSCH message of msgA using PUSCH resources indicated by the dynamic part of the PUSCH resource configuration.

A tenth aspect of the disclosure comprises a carrier containing a computer program according to the ninth aspect. The carrier is one of an electronic signal, optical signal, radio signal, or a non-transitory computer readable storage medium.

An eleventh aspect of the disclosure comprises random access methods implemented by a user equipment in a wireless communication network. In one embodiment, the method comprises receiving, via dedicated Radio Resource Control (RRC) signaling, a Physical Uplink Shared Channel (PUSCH) resource identifier indicative of a dedicated PUSCH resource for a msgA transmission, wherein msgA includes a preamble and a PUSCH message. The method further comprises transmitting, to a base station, the preamble of msgA, and transmitting, to the base station, the PUSCH message of msgA using the PUSCH resources indicated by the PUSCH resource identifier.

A twelfth aspect of the disclosure comprises a UE in a wireless communication network. The UE is configured to receive, via dedicated Radio Resource Control (RRC) signaling, a Physical Uplink Shared Channel (PUSCH) resource identifier indicative of a dedicated PUSCH resource for a msgA transmission, wherein msgA includes a preamble and a PUSCH message. The UE is further configured to transmit, to a base station, the preamble of msgA, and to transmit, to the base station, the PUSCH message of msgA using the PUSCH resources indicated by the PUSCH resource identifier.

A thirteenth aspect of the disclosure comprises a user equipment having communication circuitry for communicating with a base station and processing circuitry. The processing circuitry is configured to receive, via dedicated Radio Resource Control (RRC) signaling, a Physical Uplink Shared Channel (PUSCH) resource identifier indicative of a dedicated PUSCH resource for a msgA transmission, wherein msgA includes a preamble and a PUSCH message. The processing circuitry is further configured to transmit, to a base station, the preamble of msgA, and to transmit, to the base station, the PUSCH message of msgA using the PUSCH resources indicated by the PUSCH resource identifier.

A fourteenth aspect of the disclosure comprises a computer program for a UE in a communication network. The computer program comprises executable instructions that, when executed by processing circuitry in the UE, causes the UE to receive, via dedicated Radio Resource Control (RRC) signaling, a Physical Uplink Shared Channel (PUSCH) resource identifier indicative of a dedicated PUSCH resource for a msgA transmission, wherein msgA includes a preamble and a PUSCH message. The computer program further causes the UE to transmit, to a base station, the preamble of msgA and to transmit, to the base station, the PUSCH message of msgA using the PUSCH resources indicated by the PUSCH resource identifier.

A fifteenth aspect of the disclosure comprises a carrier containing a computer program according to the fourteenth aspect. The carrier is one of an electronic signal, optical signal, radio signal, or a non-transitory computer readable storage medium.

A sixteenth aspect of the disclosure comprises methods implemented by a base station in a wireless communication network of supporting random access. The method comprises transmitting, to a UE via dedicated RRC signaling, a Physical Uplink Shared Channel (PUSCH) resource identifier indicative of a dedicated PUSCH resource for a msgA transmission, wherein msgA includes a preamble and a PUSCH message. The method further comprises receiving, from the UE, the preamble of msgA and receiving, from the UE, the PUSCH message of msgA using the PUSCH resources indicated by the PUSCH resource identifier.

A seventeenth aspect of the disclosure comprises a base station configured to transmit, to a user equipment, configuration information including an indication of a dedicated preamble for a contention-free random access. The base station is configured to transmit, to a UE via dedicated RRC signaling, a Physical Uplink Shared Channel (PUSCH) resource identifier indicative of a dedicated PUSCH resource for a msgA transmission, wherein msgA includes a preamble and a PUSCH message. The base station is further configured to receive, from the UE, the preamble of msgA and to receive, from the UE, the PUSCH message of msgA using the PUSCH resources indicated by the PUSCH resource identifier.

An eighteenth aspect of the disclosure comprises a base station having communication circuitry for communicating with a UE and processing circuitry. The processing circuitry is configured to transmit, to a UE via dedicated RRC signaling, a Physical Uplink Shared Channel (PUSCH) resource identifier indicative of a dedicated PUSCH resource for a msgA transmission, wherein msgA includes a preamble and a PUSCH message. The processing circuit is further configured to receive, from the UE, the preamble of msgA and to receive, from the UE, the PUSCH message of msgA using the PUSCH resources indicated by the PUSCH resource identifier.

A nineteenth aspect of the disclosure comprises a computer program for a base station in a communication network. The computer program comprises executable instructions that, when executed by processing circuitry in the base station, causes the base station to transmit, to a UE via dedicated RRC signaling, a Physical Uplink Shared Channel (PUSCH) resource identifier indicative of a dedicated PUSCH resource for a msgA transmission, wherein msgA includes a preamble and a PUSCH message. The computer program further causes the base station to receive, from the UE, the preamble of msgA and to receive, from the UE, the PUSCH message of msgA using the PUSCH resources indicated by the PUSCH resource identifier.

A twentieth aspect of the disclosure comprises a carrier containing a computer program according to the nineteenth aspect. The carrier is one of an electronic signal, optical signal, radio signal, or a non-transitory computer readable storage medium.

DETAILED DESCRIPTION

Figure 1:
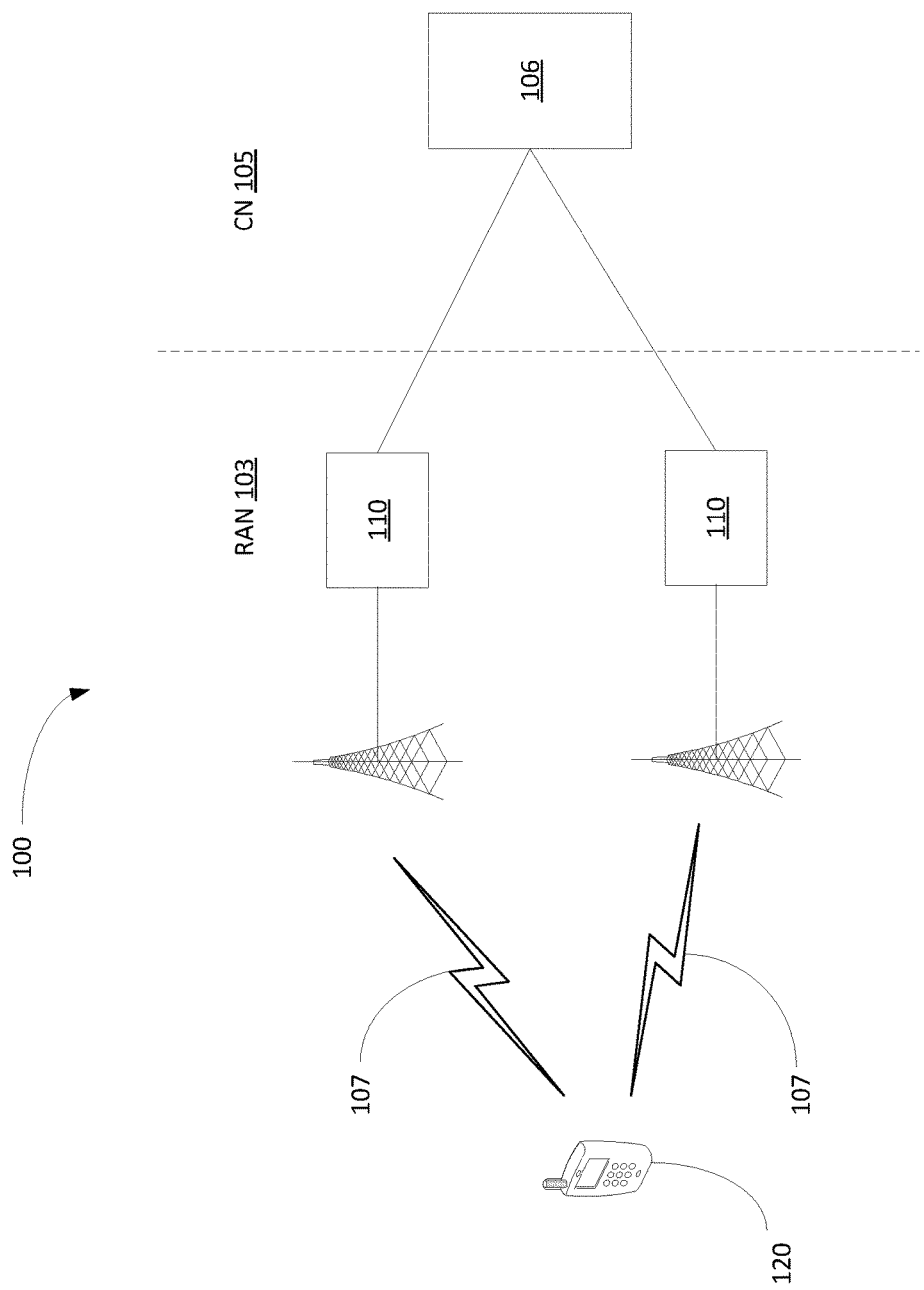
FIG. 1 illustrates an exemplary wireless communication network according to an embodiment.

Referring now to the drawings, an exemplary embodiment of the disclosure will be described in the context of a Fifth Generation (5G) wireless communication network, also known as New Radio (NR) network. Those skilled in the art will appreciate that the methods and apparatus herein described are not limited to use in 5G or NR networks, but may also be used in wireless communication networks 100 operating according to other standards to support contention-free random access procedures.

FIG. 1 illustrates a wireless communication network 100 according to the 5G standard currently being developed by Third Generation Partnership Project (3GPP). The wireless communication network 10 comprises a radio access network (RAN) 103 and a core network (CN) 105. A UE 120 communicates with one or multiple base stations 110 in the RAN 103 using radio connections 107. The base stations 110 are connected to a network node 106 in the CN 105.

For Fourth Generation (4G) networks, as known as Long Term Evolution (LTE) networks, such as specified in 3GPP TS 36.300 and related specifications, the base stations 110 corresponds typically to an Evolved NodeB (eNB) and the network node 106 corresponds typically to either a Mobility Management Entity (MME) and/or a Serving Gateway (SGW). The eNBs are part of the radio access network 103, which in this case is the Evolved Universal Terrestrial Radio Access Network (E-UTRAN), while the MME and SGW are both part of the Evolved Packet Core (EPC).

For Fifth Generation (5G) networks, also known as New Radio (NR), such as specified in 3GPP TS 38.300 and related specifications, the base stations 110 corresponds typically to a 5G NodeB (gNB) and the network node 106 corresponds typically to either an Access and Mobility Management Function (AMF) and/or a User Plane Function (UPF). The gNBs are part of the radio access network 103, which in this case is the Next Generation (NG) RAN (NG-RAN), while the AMF and UPF are both part of the 5G Core Network (5GC).

The UE 120 may comprise any type of equipment capable of communicating with the base stations 110 over a wireless communication channel. For example, the UEs 120 may comprise cellular telephones, smart phones, laptop computers, notebook computers, tablets, machine-to-machine (M2M) devices (also known as machine type communication (MTC) devices), embedded devices, wireless sensors, or other types of wireless end user devices capable of communicating over wireless communication networks 10.

Figure 2:
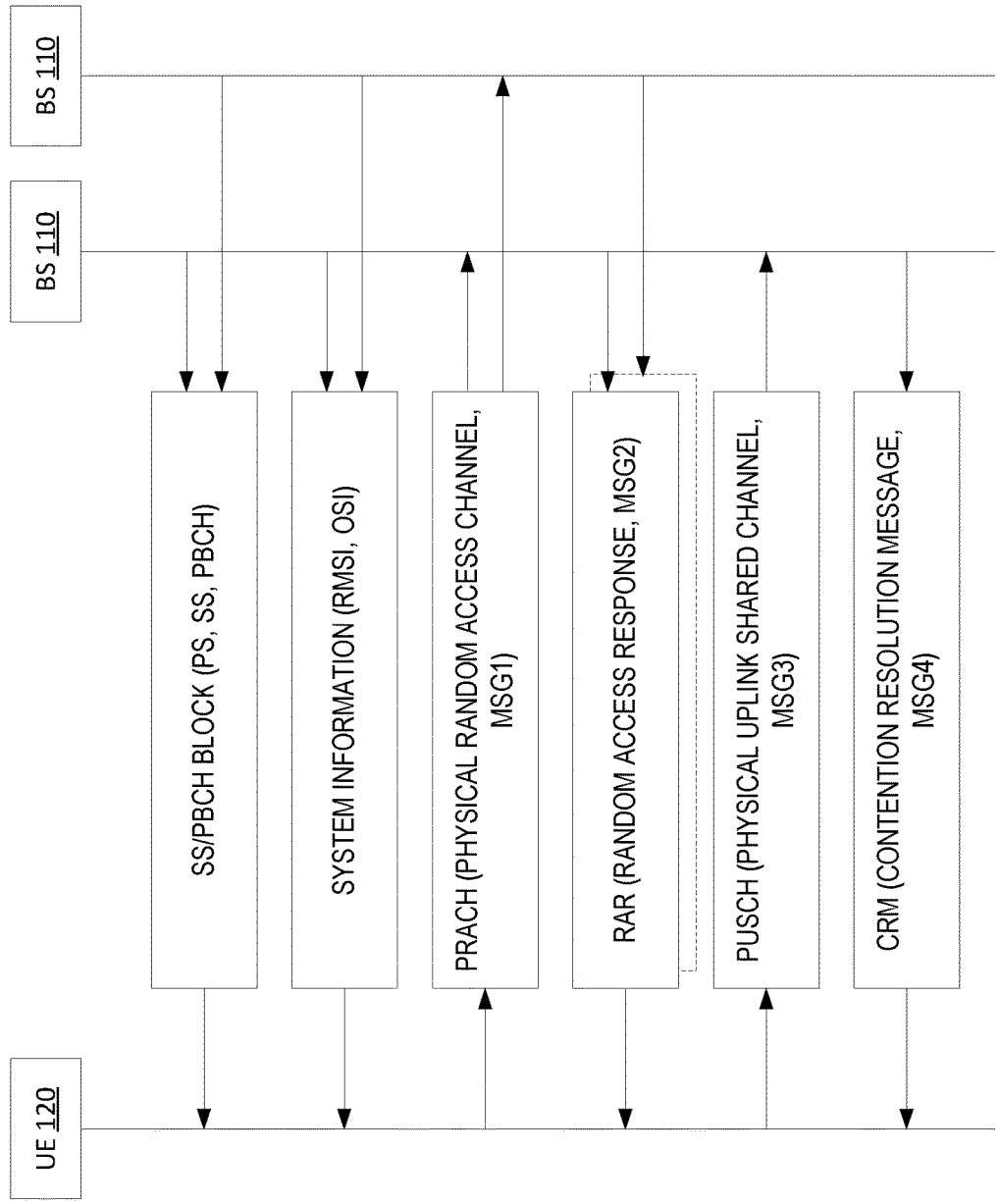
FIG. 2 illustrates a 4-step random access procedure.

In conventional networks, a 4-step random access (RA) procedure is used by the UE 120 to access the network 100. The 4-step random access procedure is shown in FIG. 2. Before initiating the RA procedure, the UE 120-detects a synchronization signal (SS) and decodes the broadcasted system information (SI). After synchronizing with the base station, the UE 120 transmits a random access preamble, also referred to as msg1, on a Random Access Channel (RACH) or Physical Random Access Channel (PRACH) and the base station 110 responds with a random access response (RAR) message, also referred to as msg2, providing the UE 120 with an uplink (UL) grant. msg1 is, among others, used by the network to determine a so-called Timing Advance (TA) command that the UE 120 should use in its uplink transmissions in order for them to reach the network's antenna at the right point in time, i.e., a point in time related to when the UE 120 receives downlink transmissions from the cell. This TA value is mainly dependent on the distance between the UE 120 and the base station/antenna, and the initial value to use is signaled to the UE 120 in msg2, based on an estimate of the time of arrival of msg1 (i.e., the PRACH preamble).

After receiving the RAR with a TA command, the UE 120 transmits a UE identification (message 3) on PUSCH. The UE 120 transmits PUSCH (message 3) after receiving a timing advance (TA) command in the RAR, allowing PUSCH to be received with a timing accuracy within the cyclic prefix. Without this TA, a very large cyclic prefix (CP) would be needed in order to be able to demodulate and detect PUSCH, unless the system is applied in a cell with very small distance between UE 120 and base station 110. Since NR will also support larger cells with a need for providing a timing advance to the UE the 4-step approach is needed for random access procedure.

The random access preamble does not enable the network to uniquely identify the UE 120. The additional information provided by the UE 120 in msg3 enables the network to resolve any conflict that may exist and the network answers msg3 with a random access contention resolution message, also referred to as msg4, indicating the UE 120 that won the contention.

The 4-step random access can be performed in two different ways; contention-based random access (CBRA) and contention-free random access (CFRA). The difference is which preamble is used. In the contention-based case, the UE 120 randomly selects a preamble from a range of preambles. Here there might be collisions if two UEs 120 select the same preamble. In the contention-free case, the UE 120 is given a specific preamble by the network and since it is given by the network, this will ensure that two UEs 120 will not select the same preamble, thus it is collision-free. The CBRA is typically used when the UE 120 is in an idle/inactive state and wants to go to the connected state, while the CFRA is used for performing handover and in beam failure procedures.

In NR, the time and frequency resource on which a PRACH preamble is transmitted is defined as a PRACH occasion.

The time resources and preamble format for PRACH transmission is configured by a PRACH configuration index, which indicates a row in a PRACH configuration table specified in TS 38.211, Tables 6.3.3.2-2, 6.3.3.2-3, 6.3.3.2-4 for FR1 paired spectrum, FR1 unpaired spectrum and FR2 with unpaired spectrum, respectively.

Part of Table 6.3.3.2-3 for FR1 unpaired spectrum for PRACH preamble format 0 is reproduced in Table 1 below, where the value of x indicates the PRACH configuration period in number of system frames. The value of y indicates the system frame within each PRACH configuration period on which the PRACH occasions are configured. For instance, if y is set to 0, then, it means PRACH occasions only configured in the first frame of each PRACH configuration period. The values in the column "subframe number" tells on which subframes are configured with PRACH occasion. The values in the column "starting symbol" is the symbol index.

In case of TDD, semi-statically configured downlink (DL) parts and/or actually transmitted SSBs can override and invalidate some time-domain PRACH occasions defined in the PRACH configuration table. More specifically, PRACH occasions in the UL part are always valid, and a PRACH occasion within the X part is valid as long as it does not precede or collide with a Synchronization Signaling Block (SSB) in the RACH slot and it is at least N symbols after the DL part and the last symbol of an SSB. N is 0 or 2 depending on PRACH format and subcarrier spacing.

TABLE 1

PRACH configuration for preamble format 0 for FR1 unpaired spectrum

| PRACH Configuration Index | Preamble format | $n_{SFN}$ mod x = y | | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| | | x | y | | | | | |
| 0 | 0 | 16 | 1 | 9 | 0 | — | — | 0 |
| 1 | 0 | 8 | 1 | 9 | 0 | — | — | 0 |
| 2 | 0 | 4 | 1 | 9 | 0 | — | — | 0 |
| 3 | 0 | 2 | 0 | 9 | 0 | — | — | 0 |
| 4 | 0 | 2 | 1 | 9 | 0 | — | — | 0 |
| 5 | 0 | 2 | 0 | 4 | 0 | — | — | 0 |
| 6 | 0 | 2 | 1 | 4 | 0 | — | — | 0 |
| 7 | 0 | 1 | 0 | 9 | 0 | — | — | 0 |
| 8 | 0 | 1 | 0 | 8 | 0 | — | — | 0 |
| 9 | 0 | 1 | 0 | 7 | 0 | — | — | 0 |
| 10 | 0 | 1 | 0 | 6 | 0 | — | — | 0 |
| 11 | 0 | 1 | 0 | 5 | 0 | — | — | 0 |
| 12 | 0 | 1 | 0 | 4 | 0 | — | — | 0 |
| 13 | 0 | 1 | 0 | 3 | 0 | — | — | 0 |
| 14 | 0 | 1 | 0 | 2 | 0 | — | — | 0 |
| 15 | 0 | 1 | 0 | 1,6 | 0 | | | 0 |
| 16 | 0 | 1 | 0 | 1,6 | 7 | — | — | 0 |
| 17 | 0 | 1 | 0 | 4,9 | 0 | — | — | 0 |
| 18 | 0 | 1 | 0 | 3,8 | 0 | — | — | 0 |
| 19 | 0 | 1 | 0 | 2,7 | 0 | — | — | 0 |
| 20 | 0 | 1 | 0 | 8,9 | 0 | — | — | 0 |
| 21 | 0 | 1 | 0 | 4,8,9 | 0 | — | — | 0 |
| 22 | 0 | 1 | 0 | 3,4,9 | 0 | — | — | 0 |
| 23 | 0 | 1 | 0 | 7,8,9 | 0 | — | — | 0 |
| 24 | 0 | 1 | 0 | 3,4,8,9 | 0 | — | — | 0 |
| 25 | 0 | 1 | 0 | 6,7,8,9 | 0 | — | — | 0 |
| 26 | 0 | 1 | 0 | 1,4,6,9 | 0 | — | — | 0 |
| 27 | 0 | 1 | 0 | 1,3,5,7,9 | 0 | — | — | 0 |

In the frequency domain, NR supports multiple frequency-multiplexed PRACH occasions on the same time-domain PRACH occasion. This is mainly motivated by the support of analog beam sweeping in NR such that the PRACH occasions associated to one SSB are configured at the same time instance but different frequency locations. The number of PRACH occasions frequency division (FD) multiplexed in one time domain PRACH occasion can be 1, 2, 4, or 8.

Figure 3:
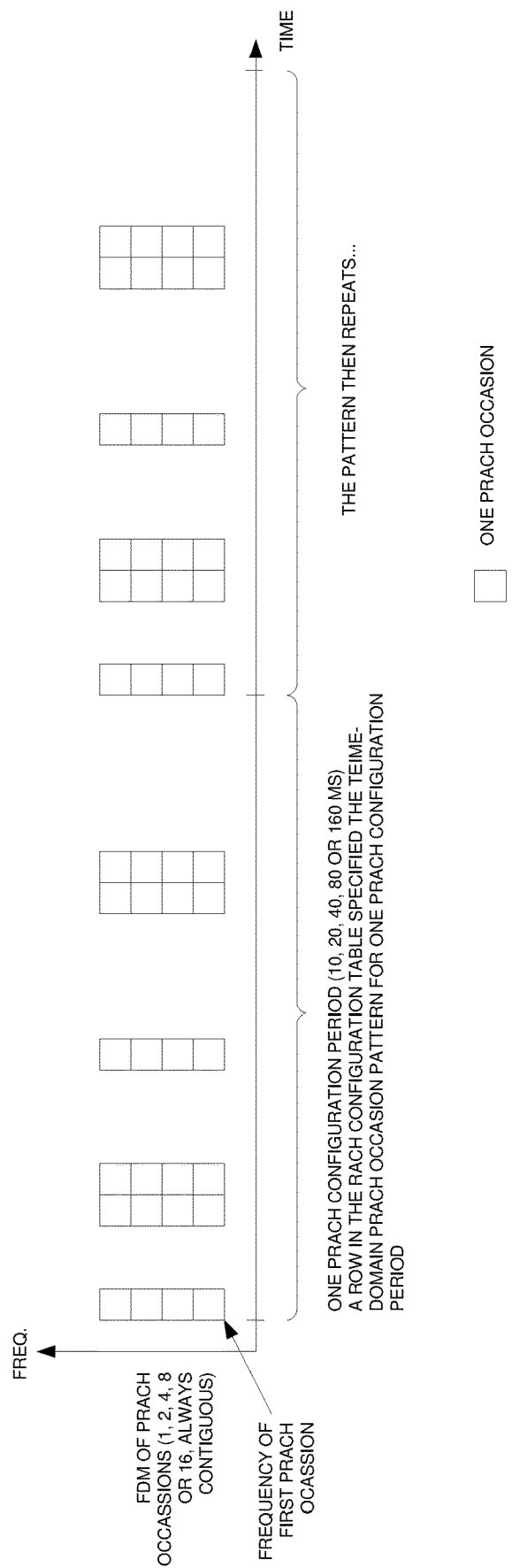
FIG. 3 illustrates an exemplary PRACH configuration in NR.

FIG. 3 illustrates one example of the PRACH occasion configuration in NR.

In NR Rel-15, there are up to 64 sequences that can be used as random-access preambles per PRACH occasion in each cell. The Radio Resource Control (RRC) parameter totalNumberOfRA-Preambles determines how many of these 64 sequences are used as random-access preambles per PRACH occasion in each cell. The 64 sequences are configured by including firstly all the available cyclic shifts of a root Zadoff-Chu sequence, and secondly in the order of increasing root index, until 64 preambles have been generated for the PRACH occasion.

Figure 4:
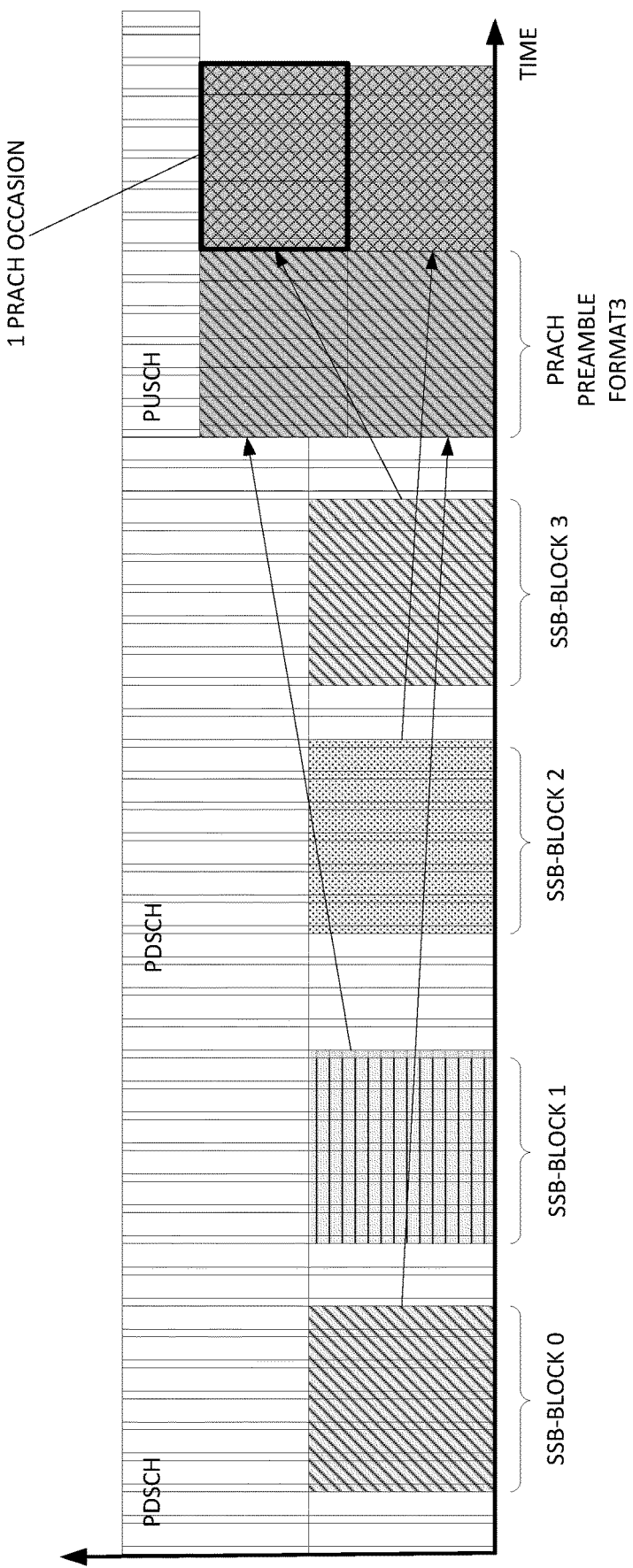
FIG. 4 illustrates an exemplary one-to-one mapping between SSBs and PRACH occasions
Figure 5:
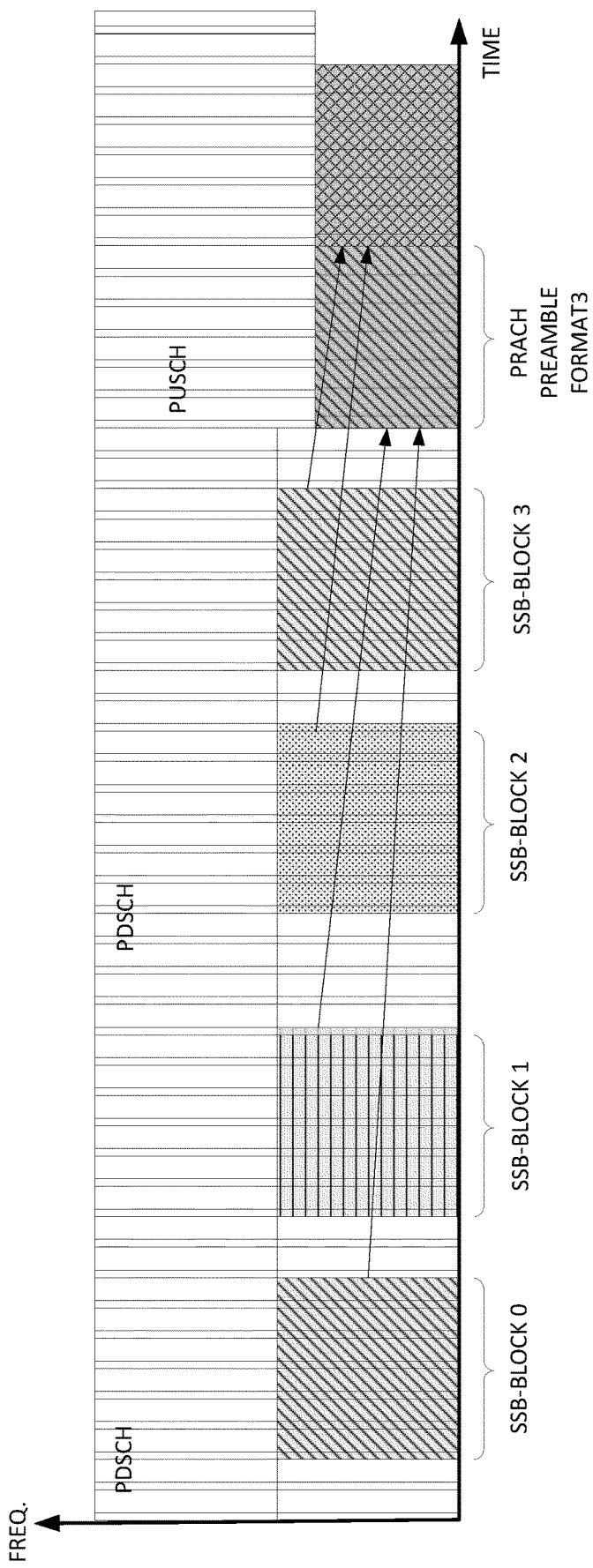
FIG. 5 illustrates an exemplary many-to-one mapping between SSBs and PRACH occasions

NR Rel-15 supports one-to-one, one-to-many, and many-to-one association between SSB and PRACH occasions. FIG. 4 illustrates an example of one-to-one mapping between SSBs and PRACH preambles. FIG. 5 illustrates an example where two SSBs are mapped to each PRACH preamble.

The preambles associated to each SSB are configured by the two RRC parameters in the RACH-ConfigCommon information element (IE): ssb-perRACH-OccasionAndCB-PreamblesPerSSB and totalNumberOfRA-Preambles. The detailed mapping rule is specified in TS 38.213 section 8.1, as follows:

A UE is provided a number of SS/PBCH blocks associated with one PRACH occasion and a number of contention based preambles per SS/PBCH block per valid PRACH occasion by ssb-perRACH-OccasionAndCB-PreamblesPerSSB. If N<1, one SS/PBCH block is mapped to 1/N consecutive valid PRACH occasions and R contention based preambles with consecutive indexes associated with the SS/PBCH block per valid PRACH occasion start from preamble index 0. If N≥1, R contention based preambles with consecutive indexes associated with SS/PBCH block n, 0≤n≤N−1, per valid PRACH occasion start from preamble index where $n \cdot N_{preamble}^{total}/N$ where $N_{preamble}^{total}$ is provided by totalNumberOfRA-Preambles and is an integer multiple of N.

Figure 6:
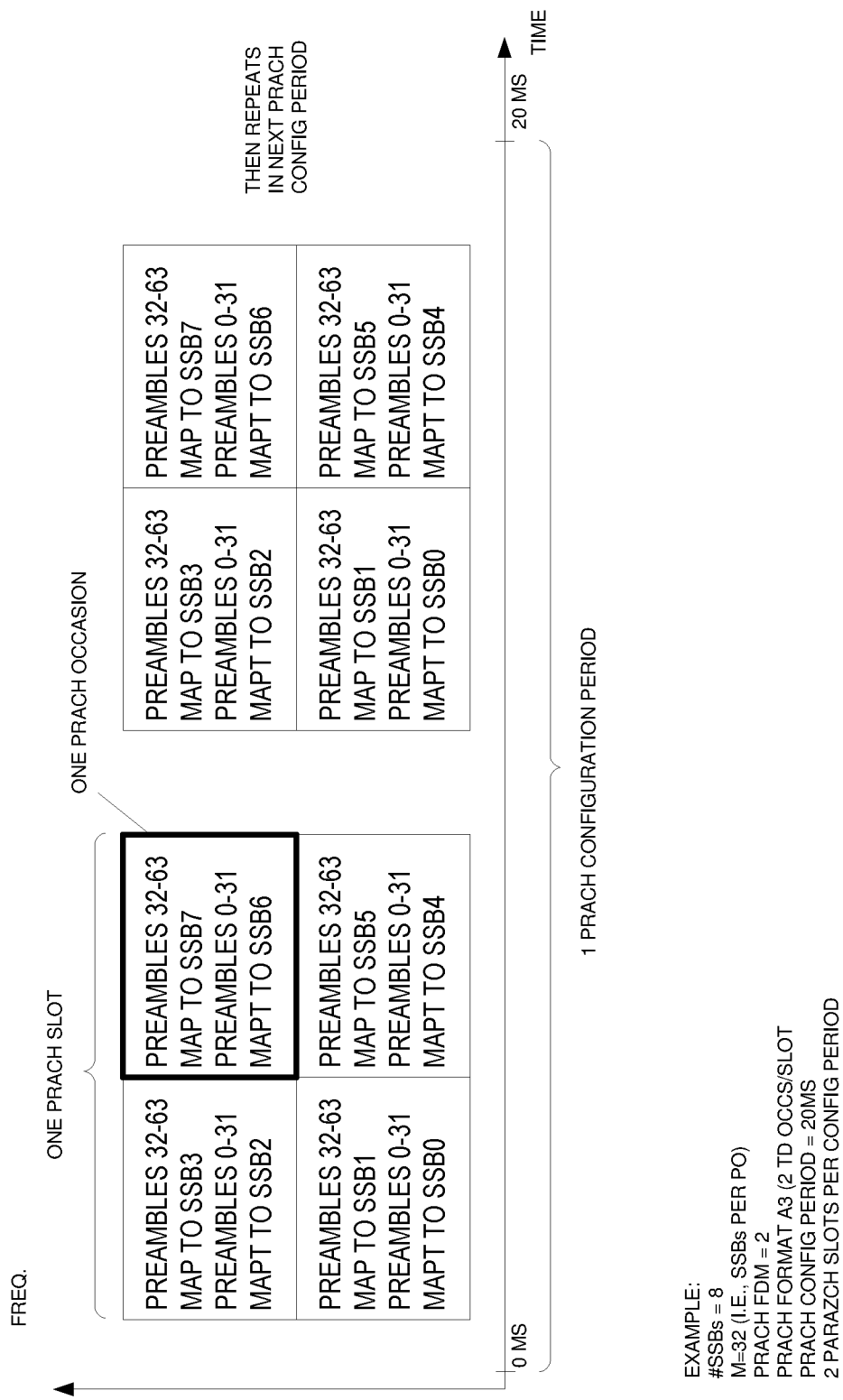
FIG. 6 illustrates an exemplary mapping between SSBs and random access preambles.

In other words, the mapping between SSB and preambles is done by consecutively associating M preambles to each SSB, where M=I, and as illustrated in FIG. 6 the preambles are taken in the following order:

First, in increasing order of preamble indexes within a single PRACH occasion.

Second, in increasing order of frequency resource indexes for frequency multiplexed PRACH occasions.

Third, in increasing order of time.

Figure 7:
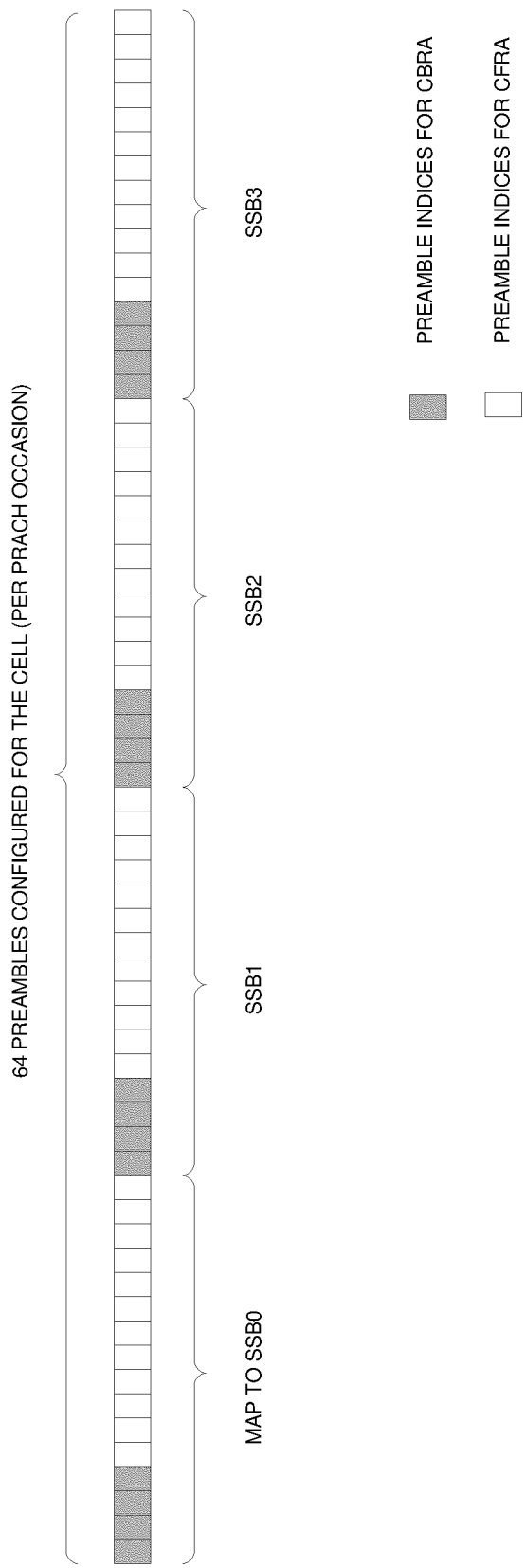
FIG. 7 illustrates the associated preambles for CBRA and CFRA per SSB per PRACH occasion.

For each SSB, the associated preambles per PRACH occasion are further divided into two sets for contention-based random access (CBRA) and contention-free random access (CFRA). The number of contention-based (CB) preambles per SSB per PRACH occasion is signaled by the RRC parameter #CB-preambles-per-SSB. Preamble indices for CBRA and CFRA are mapped consecutively for one SSB in one PRACH occasion, as shown in FIG. 7.

Figure 8:
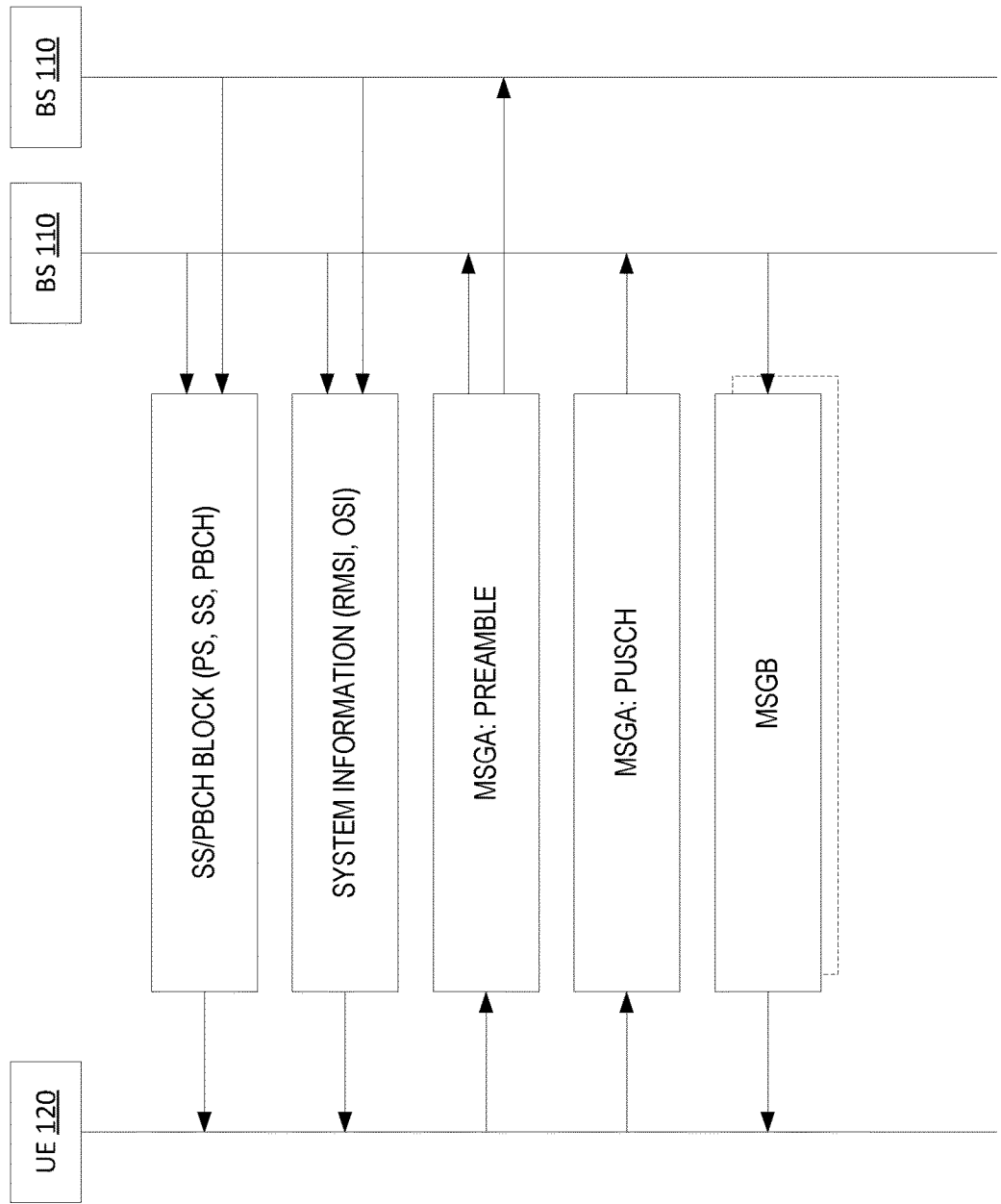
FIG. 8 illustrates a 2-step random access procedure.

Two-step random access is a modification of the regular four-step random access procedure and is being considered for NR networks. An exemplary two-step random access procedure is shown in FIG. 8. Essentially, the two-step random access procedure lumps Message 1 (msg1) and Message 3 (msg3) of the standard 4-step procedure into a message, labeled Message A (msgA) in a first step of the random access procedure. msgA thus contains a random access preamble transmitted on Physical Random Access Channel (PRACH) transmission resources combined with a transmission of the remainder of msgA (corresponding to msg3) on PUSCH transmission resources. The PUSCH part of the msgA transmission may include higher layer data such as a RRC connection request possibly with some small payload. An association is made between the random access preamble and the PUSCH transmission resources to be used for the PUSCH part of msgA. Such preamble-PUSCH resource associations could potentially be one-to-many, one-to-one or even one-to-many. The transmission of msgA in the first step is followed by a second, concluding step comprising the transmission of a message, labeled Message B (msgB), that combines msg2 and msg4 including, inter alia, the UE identifier assignment, TA information and contention resolution message.

The two-step random access can be a contention-based random access (CBRA) or a contention-free random access (CFRA). Because CFRA is the commonly preferred random access variant when a UE 120 accesses the target cell in conjunction with a handover or SCG change (or SCG addition, or SCell addition, etc.), support for CFRA is needed to make two-step random access an attractive option when compared to RACH-less handover to be implemented by a network vendor. In addition, even if a UE 120 were to use a contention-free random access preamble (i.e., unique preamble), as is the case in a CFRA procedure, this would only ensure that the UE 120 can avoid preamble collisions, but the PUSCH part of msgA could still have the risk of collision with msgA transmissions from other UEs 120.

For transmission of msgA PUSCH, i.e., the PUSCH part of msgA, the notion of a PUSCH Resource Unit has been introduced, where a PUSCH Resource Unit consists of time-frequency radio resources of transmission and DMRS sequence configuration. Two simultaneous msgA PUSCH transmissions can be distinguished by the receiver different PUSCH Resource Units have been used for the two transmissions.

In order for 2-step to work for CBRA, the network needs to configure static resources both for the PRACH preamble as well as msgA PUSCH occasions. Currently, there can be two different PUSCH occasions depending on the size of the msgA PUSCH payload. Thus, when the UE 120 performs from an idle/inactive state it needs to read the configurations and use the configured PRACH and msgA PUSCH configurations. These are configured per bandwidth part (BWP)

For CFRA, the PUSCH resource for 2-step CFRA associated with the dedicated preamble will be configured for the UE 120 via dedicated signaling (i.e., will not be included in System Information Block 1 (SIB1)). One aspect of this disclosure comprises different methods the resource allocation of msgA PUSCH. As used herein, the msgA resources include at least one of time domain resources, frequency domain resources, DMRS resources and the modulation and coding scheme (MCS) configurations.

In one embodiment, to allow for efficient signaling and to adhere to configurations of the target cell, only a limited part (i.e., less than all), of the msgA PUSCH resource configuration is provided through a partial grant containing a partial PUSCH resource configuration for msgA transmission. The partial PUSCH resource configuration contains a limited amount of information to either dynamically or semi-dynamically give the UE 120 resources to transmit msgA PUSCH in a contention-free manner. The partial PUSCH resource configuration provides a part only of the PUSCH resources. The dynamically signaled fields may be time domain random access (TDRA) and/or frequency domain (FDRA) fields and/or MCS configurations and/or DMRS configurations in the dedicated signaling. Thus, the UE 120 can use some of the PUSCH configurations of the target cell while still having the msgA PUSCH resource contention free. More generally, the dynamic part of the msgA PUSCH resource configuration comprises the information necessary for contention free random access. Dynamic and/or semi-dynamic signaling of the PUSCH resource configuration can be carried out via RRC signaling or via physical layer signaling (e.g., Downlink Control Information). The term dynamic signaling includes semi-dynamic signaling. The term semi-dynamic signaling typically refers to RRC signaling whereas dynamic signaling refers to either RRC signaling or DCI.

For handover or SCG change, the UE-specific configuration is preferably included in the HandoverCommand message, which is prepared by the RRC entity in the target base station 110 to be carried to the source base station 110 in an internode (e.g., XnAP or X2AP) message called Handover Request Acknowledge. The HandoverCommand message contains RRC or Radio Resource Management (RRM) configuration that the UE 120 should apply in the target cell. This configuration is forwarded by the source base station 110 to the UE 120 in the RRCReconfiguration message (in NR) or RRCConnectionReconfiguration message (in LTE), which triggers/orders the UE 120 to execute the handover (or SCG change).

To avoid collision on the PUSCH transmission resources where the PUSCH part of msgA is transmitted, dedicated PUSCH transmission resources are needed for the UE 120. Unlike random access preambles, PUSCH transmissions are not orthogonal and will interfere negatively with each other in the event of a collision. In addition to the PUSCH transmission resource, e.g., time and frequency resource allocation, the configuration of dedicated PUSCH transmission resources could optionally comprise further transmission related aspects, such as Modulation and Coding Scheme (MCS), transmit power configuration (e.g., TPC command), frequency hopping configuration (e.g., a frequency hopping flag), Channel State Information (CSI) request, DMRS antenna port and/or a Demodulation Reference Signal (DMRS) configuration.

Optionally, the source base station 110 could include an indication of the UE's support (or lack of support) for two-step random access in the HandoverPreparationInformation message. The HandoverPreparationInformation message is prepared by the RRC entity in the source base station 110 and transferred to the target base station 110 in an inter-node 110 (e.g., XnAP or X2AP) message called Handover Request.

Signaling of TDRA

For TDRA of msgA PUSCH in CFRA case, one or more of the following methods can be used:
the reference point for the TDRA is the end of a slot overlapping with the RACH occasion (RO) or transmission of the corresponding preamble part or the beginning of the slot overlapping with the RO for the transmission of the corresponding preamble part.

the reference point is with respect the msgA PUSCH CBRA resource configured in the target cell.

the reference point for the TDRA is the end of the slot with a transmission of the corresponding PDSCH carrying the message triggering the CFRA with 2-step RA type, i.e., the handover command.

include a time domain resource assignment (TDRA) field with value m to indicate a row index m+1 to an allocated table which can be one or more of the following tables:

pusch-TimeDomainAllocationList in pusch-Config-Common IE pusch-TimeDomainAllocationList in pusch-Config IE default table defined by Table 6.1.2.1.1-2 and/or Table 6.1.2.1.1-3 in 38.214 V16.0.0 new TDRA tables, other than the tables above, separately configured or defined for msgA PUSCH in CFRA the delta values specified in Table 6.1.2.1.1-5 in 38.214 V16.0.0 is not used for msgA PUSCH a separately configured K2 value can be provided in the dedicated signaling for a slot level offset between the end of the preamble slot and the start of the msgA PUSCH slot. The new parameter can be included in the RACH-ConfigDedicated IE or in some IE to be included in the RACH-ConfigDedicated IE. For example, a msgA-PUSCH-TimeDomainOffset-CFRA parameter included in the RACH-ConfigDedicated IE can be used to provide a single time offset with respect to the start of the PRACH slot for the preamble transmission, counted as the number of slots (based on the numerology of the active UL BWP).

a separately configured K2 value is provided in the dedicated signaling for a slot level offset between the end a PDSCH transmission (see above) and the start of the msgA PUSCH slot E.g., realized in the form of a parameter included in the RACH-ConfigDedicated IE, as described above.

The start OFDM symbol and the number of OFDM symbols for msgA PUSCH transmission within one slot can be directly signaled in an RRC message for CFRA. The new parameter for CFRA can be included in the RACH-ConfigDedicated IE or in some IE to be included in the RACH-ConfigDedicated IE. For example, a startSymbolAndLength-MsgA-PO-CFRA parameter can be included in the RACH-ConfigDedicated IE to provide an index giving valid combinations of start symbol, length and mapping type as start and length indicator (SLIV) for the first msgA PUSCH occasion, for RRC_CONNECTED UEs in non-initial BWP. The network can configure the field so that the allocation does not cross the slot boundary. The number of occupied symbols excludes the guard period. If the field is absent, the UE shall use the value in msgA-TimeDomainAllocation.

Figure 9:
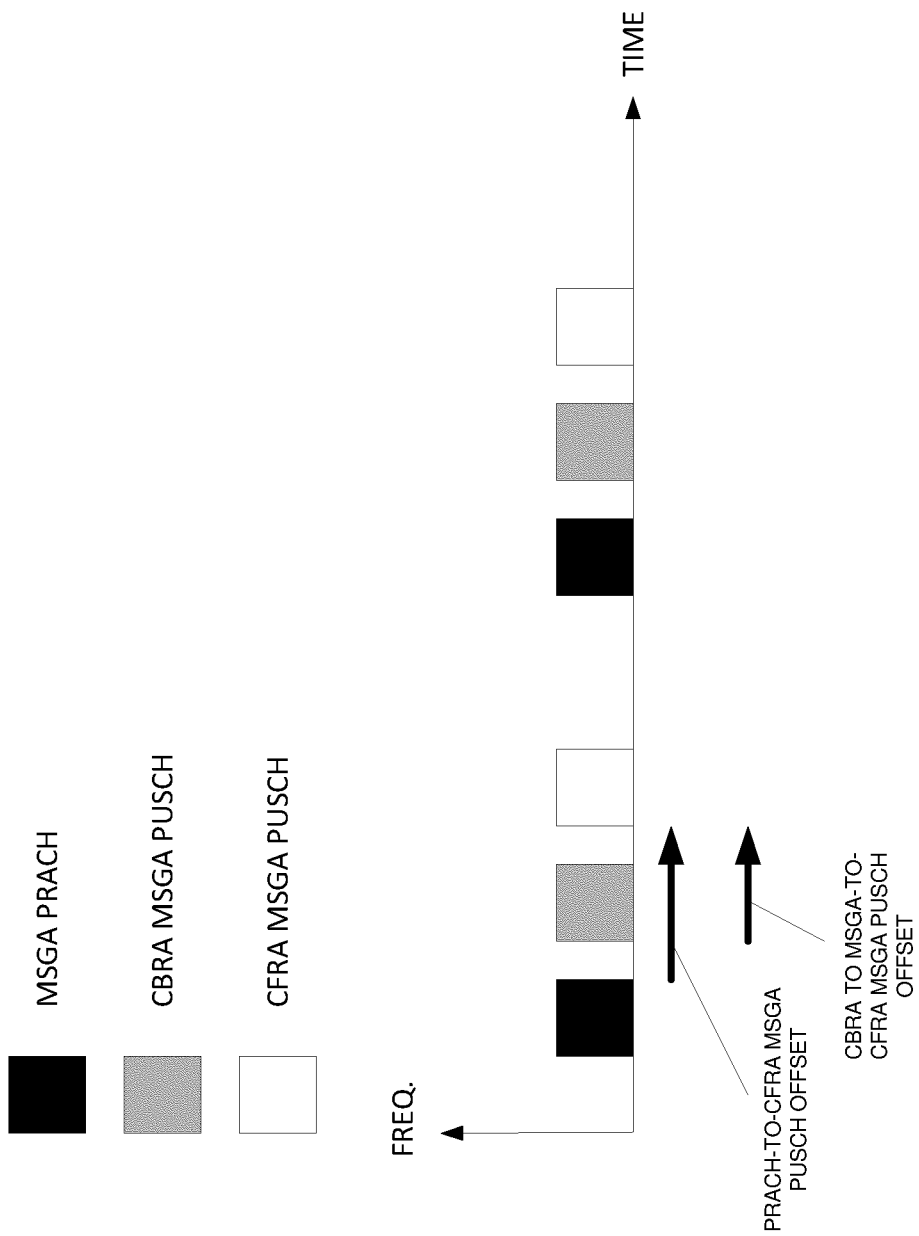
FIG. 9 illustrates a periodic time domain resource allocation for msgA PUSCH with offset relative to either PRACH or CBRA msgA PUSCH.

In some embodiments, the msgA PUSCH allocations for a UE 120 are a set of periodic allocations. Periodic allocations may be needed as the network may not ensure when the handover command containing the configurations will be received by the UE 120. An example of periodic msgA PUSCH allocations is shown in FIG. 9.

Figure 10:
FIG. 10 illustrates multiple CFRA msgA PUSCH occasions per PRACH occasion.

In other embodiments, multiple PUSCH allocations are given for a single PRACH occasion in order to increase the reliability of detection. This can for instance enable URLLC since the probability of needing to retransmit is much lower. An example of multiple msgA PUSCH allocations is shown in FIG. 10.

Signaling FDRA

Figure 11:
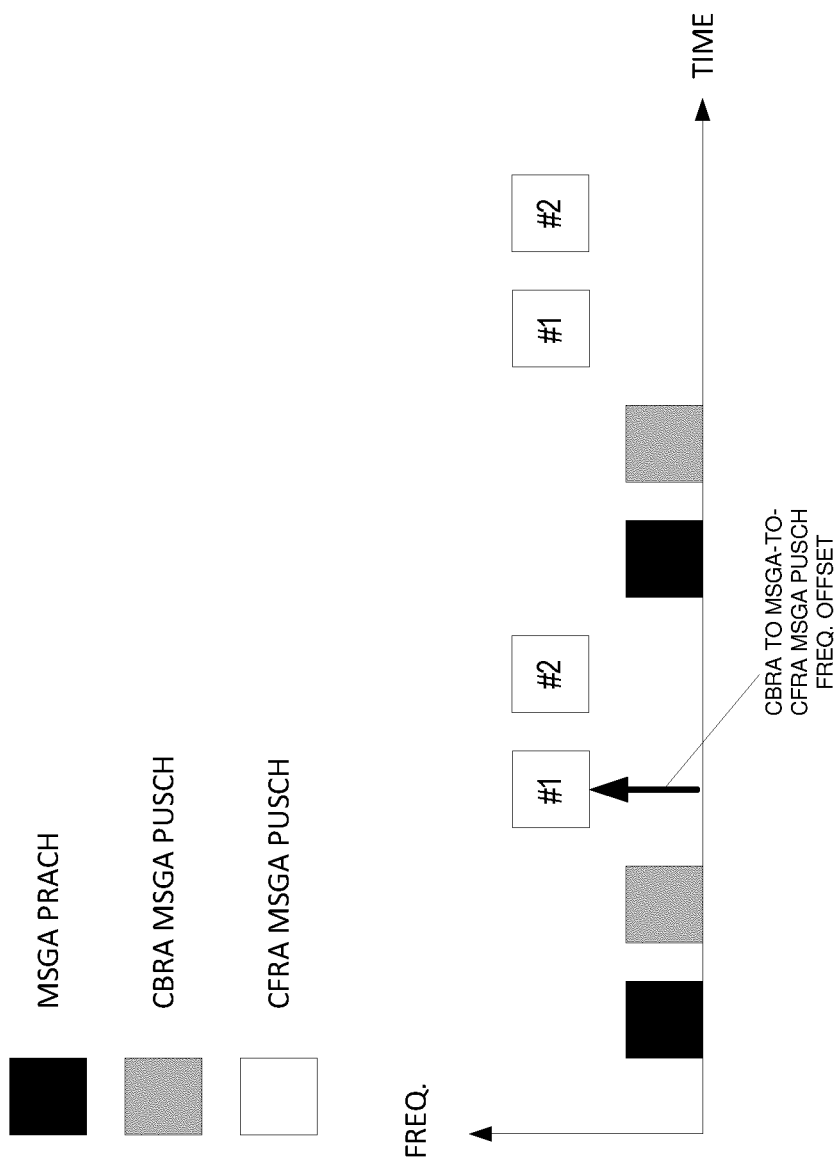
FIG. 11 illustrates frequency domain resource allocation for msgA PUSCH with offset to CBRA FDRA.

For FDRA of msgA PUSCH in CFRA case, one or more of the following methods can be used:

the reference point for the FDRA is either the msgA PRACH configuration or the CBRA msgA PUSCH configuration. An example of this along with sub-embodiment 1.2 can be seen in FIG. 11 as a variation of FIG. 9.

the reference point for the FDRA is the start physical resource block (PRB) of the BWP One or more new parameters for CFRA can be included in RACH-ConfigDedicated IE or in some IE to be included in RACH-ConfigDedicated IE. For example, the new parameters may comprise a nrofPRBs-PerMsgA-PO-CFRA parameter giving the number of PRBs per PUSCH occasion and a frequencyS-tartMsgA-PUSCH-CFRA parameter giving the offset of PUSCH occasion in frequency domain with respect to PRB 0.

Signaling Configuration Via New IE in RACH-ConfigDedicated IE

In some embodiments, a new IE containing the at least a portion of the information for the msgA PUSCH transmission is included in the RACH-ConfigDedicated IE. This new IE (used in another IE) can also be used for configuration of msgA PUSCH in the CBRA case. The new IE may, for example, be called msgA-PUSCH-Resource, dedicatedMsgA-PUSCH-Resource or msgA-PUSCH-ResourceCFRA, and may include all or a subset of TDRA, CFRA, DMRS sequence(s), -MCS and scrambling information.

Signaling DMRS and/or MCS Configurations

In some embodiments, the MCS and/or DMRS configurations are explicitly configured in dedicated RRC signaling. As an example, one or more of the following parameters can be used to signal DMRS or MCS configurations:

msgA-MCS-CFRA indicates the MCS index for msgA PUSCH in CFRA from the Table 6.1.4.1-1 for DFT-s-OFDM and Table 5.1.3.1-1 for CP-OFDM in 3GPP TS 38.214.

msgA-DMRS-Config-CFRA indicates the DMRS configuration for msgA PUSCH in CFRA. This IE can include one or more of the following parameters:

msgA-dmrs-AdditionalPosition indicates the position for additional DM-RS. If the field is absent, the UE applies value 'pos2'.

msgA-maxLength, indicates single-symbol or double-symbol DMRS. If the field is absent, the UE applies value len1'.

msgAPUSCHDMRSCDMgroup indicates the number of code division multiplexing (CDM) groups the PUSCH will use.

msgAPUSCHDMRSCDMgroupNr indicates the CDM group number used.

msgAPUSCHNrOfPort indicates 1 port per CDM group, 1 indicates 2 ports per CDM group, if the field is absent then 4 ports per CDM group are used.

msgAPUSCHPortNr indicates which port is used in the CDM group msgA-scramblingID0 indicates the UL DMRS scrambling initialization for CP-OFDM. When the field is absent the UE applies the value Physical cell ID (physCellId).

msgA-scramblingID1 provides UL DMRS scrambling initialization for CP-OFDM. When the field is absent the UE applies the value Physical cell ID (physCellId).

In some embodiments, the number of the CDM groups and/or the number of ports per CDM group for CFRA in 2-step RA can be the same as that used for the CBRA in 2-step RA procedure, i.e., the UE can utilize the more general configuration in the target cell.

Signaling msgA PUSCH Resource ID And PRU ID

In one embodiment, a msgA PUSCH resource ID and a PRU ID signaling are provided in the dedicated RRC signaling for resource of msgA PUSCH in 2-step CFRA, i.e., an existing PUSCH resource for CBRA is reused by CFRA in 2-step RACH procedure. Here the PRU means a DMRS resource configuration in one PUSCH occasion, and msgA PUSCH resource ID means the time-frequency resource, so the combination of the 2 means a unique time, frequency and DMRS resource for msgA PUSCH transmission, i.e., a unique PUSCH Resource Unit. The msgA PUSCH resource ID and a PRU ID are referred to herein more generally as PUSCH resource identifiers.

In this approach, one of the PUSCH occasions with one of the DMRS resource configurations is indicated in the dedicated signaling, which avoids additional dynamic PUSCH resource to be allocated for msgA PUSCH.

In a variation of this approach, the dedicated signaling includes a single reference to a msgA PUSCH configuration in the target cell (or BWP). The msgA PUSCH configuration may contain configurations of resources such as (TDRA and CFRA) and DMRS configuration and wherein this msgA PUSCH configuration may be used for the CBRA case too.

The reference may take the form of either of:
  an explicit reference, e.g., a msgA PUSCH configuration ID, e.g., referring to a msgA PUSCH configuration provided for 2-step CBRA in the target cell,
  when a msgA PUSCH configuration for the CBRA case is reused, the reference may be implicit in the form of the CBRA preamble (or the index or identity of the CBRA preamble) which is associated with the msgA PUSCH configuration being reused, or
  when a msgA PUSCH configuration for the CBRA case is reused for CFRA and the msgA PUSCH configurations are configured in a list of msgA PUSCH configurations, the reference may be implicit in the form of the order number in the list where the reused msgA PUSCH configuration is included (i.e., if the msgA PUSCH configuration to be reused is the third msgA PUSCH configuration in the list of msgA PUSCH configurations, the reference may be number 3 or, if the list numbering starts at 0, number 2). Note that the list of msgA PUSCH configurations may be realized as a part of another list, e.g., a list of CBRA preambles for 2-step random access, where each CBRA preamble has an associated msgA PUSCH configuration.

Resource Mapping

One embodiment introduces a mapping between CFRA preambles and the PO resources configured for CBRA. For example, CFRA preamble groups can be defined and mapped one-to-one to the msgA PUSCH configurations. Within each CFRA preamble group, the CFRA preamble are one-to-one mapped to the PRU within the corresponding msgA PUSCH configuration. This method is another way to reuse the existing CBRA msgA PUSCH resource for the CFRA in 2-step RACH procedure, but may not ensure that the msgA PUSCH resource is collision-free, since other UEs 120 might utilize the same configurations.

Releasing Resources

In some embodiments, the release time of the msgA PUSCH resource is the end of the msgA PUSCH transmission. In one example, the release time of the msgA PUSCH resource is the end of the last allowed reattempt of the msgA PUSCH transmission. In another example, the release time of the msgA PUSCH resource is governed by a timer, where the timer may be signaled to the UE in the system information or the dedicated signaling or may be specified in a standard specification.

In some embodiments, the resource is not released when it is one of the PUSCH resources used by CBRA unless it is released by CBRA.

In another embodiment, the release time of the msgA PUSCH resource is a RAN node implementation matter.

Figure 12:
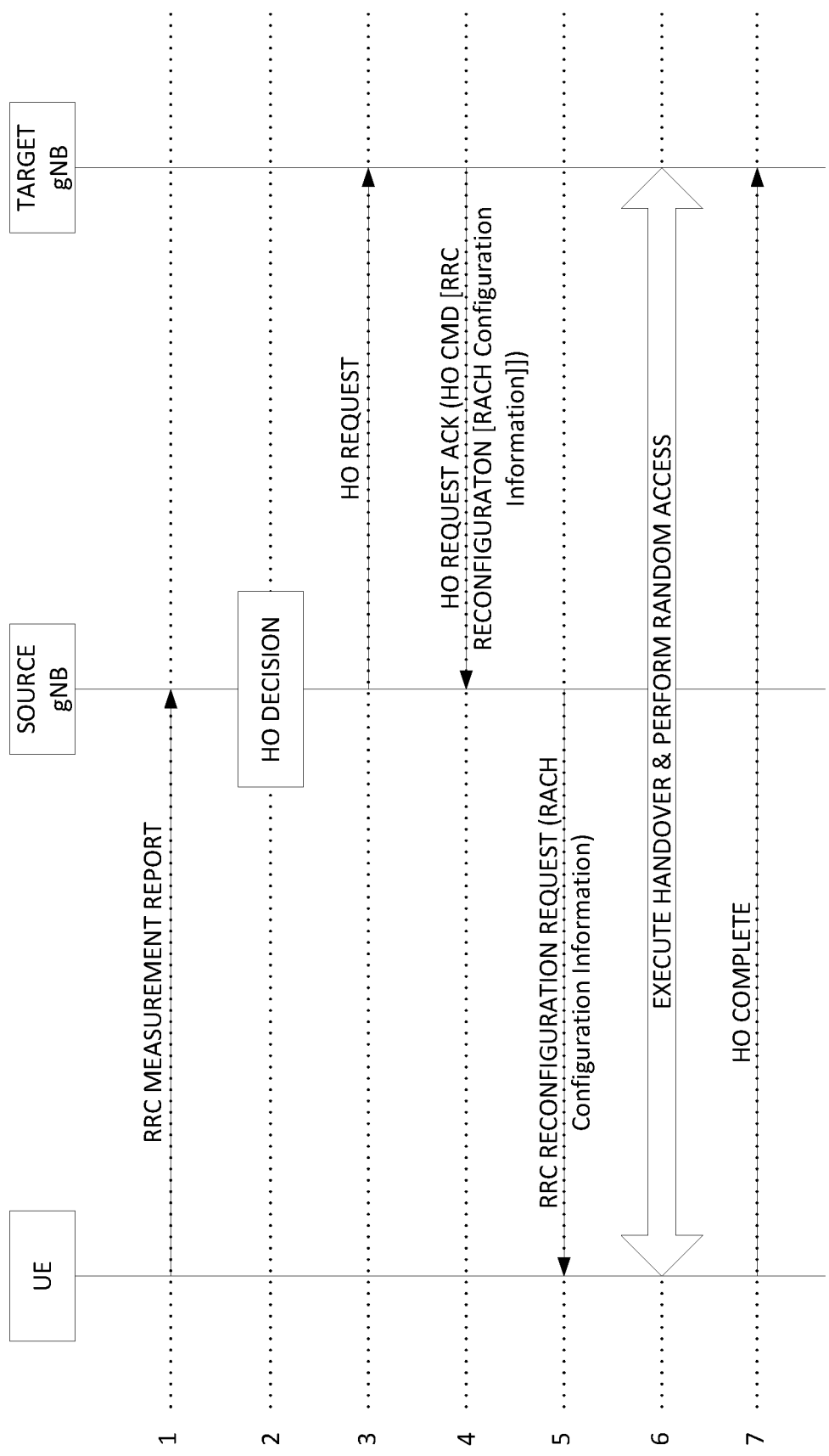
FIG. 12 illustrates an exemplary handover procedure incorporating signaling of PUSCH resource configuration for a msgA transmission.

FIG. 12 is a signaling flow diagram illustrating an exemplary handover procedure that supports two-step, contention-free RA. The UE 120 sends a RRC measurement report to the source base station 110 including measurements taken on reference signals from neighboring base stations 110 (1). Based on the RRC measurement report from the UE 120, the source base station 110 determines that a handover is needed and sends a Handover Request (HO Request) to a target base station 110 (2, 3). In answer to the Handover Request, the target base station 110 returns a Handover Command (HO Command) in a Handover Request Acknowledge (HO Request Ack) message (4). The Handover Command contains RRC configuration information that includes RACH configuration information for two-step RA that the UE 120 should apply in the target cell. The HO Command is an inter-node RRC message included in the form of a target-to-source transparent container in the Handover Request Acknowledge message. The HO Command contains the dedicated RACH preamble to use in the target cell. Additionally, the HO Command may contain mapping information for a dedicated preamble to PUSCH transmission resource mapping. Alternatively, the dedicated preamble to PUSCH transmission resource mapping could be provided as part of SI or be specified by standard. In another embodiment, no explicit preamble dedicated resource mapping is used. Instead, the target base station 110 configures dedicated PUSCH resources and the configured dedicated PUSCH resources are included in the HO Command. The base station 110 forwards the RRC configuration information received from the target cell to the UE 120 in a RRC Reconfiguration Request message (RRCReconfiguration) or RRC Connection Reconfiguration Request message (RRCConnectionReconfiguration)(5). The RRC configuration information contains the (re)configuration from the target node to be applied in the target cell. The RRCReconfiguration/RRCConnectionReconfiguration message triggers the UE 120 to execute the handover and perform a random access in the target cell (6). After accessing the target cell, the UE 120 sends a Handover Complete message to the target base station 110 (7) to complete the handover.

In addition to the handover use case, the two-step, contention-free random access can be configured for other control plane/RRC procedures such as:
  Transition from inactive to connected mode. In this case, the UE 120 is in connected mode when it receives an RRC release-like message (e.g., RRCRelease with a suspend configuration) configuring two-step, contention-free random access;
  Transition from idle to connected mode. In this case, the UE 120 is in connected mode when it receives an RRC release-like message (e.g., RRCRelease without a suspend configuration) configuring two-step, contention-free random access;

SCG addition, SCell addition or any form of multi-connectivity or carrier aggregation;

Beam failure recovery.

This list of procedures where two-step, contention-free random access can be configured is not intended to be exhaustive but simply to illustrate the range of possibilities.

In the examples above, SSBs have been used as examples of reference signals that are measured by the UE 120 and that map to RACH configurations. However, that is not a limiting factor. For example, there may be a mapping between CSI-RS resources and PRACH resources mapped to PUSCH resources, for the purpose of 2-step random access.

Figure 13:
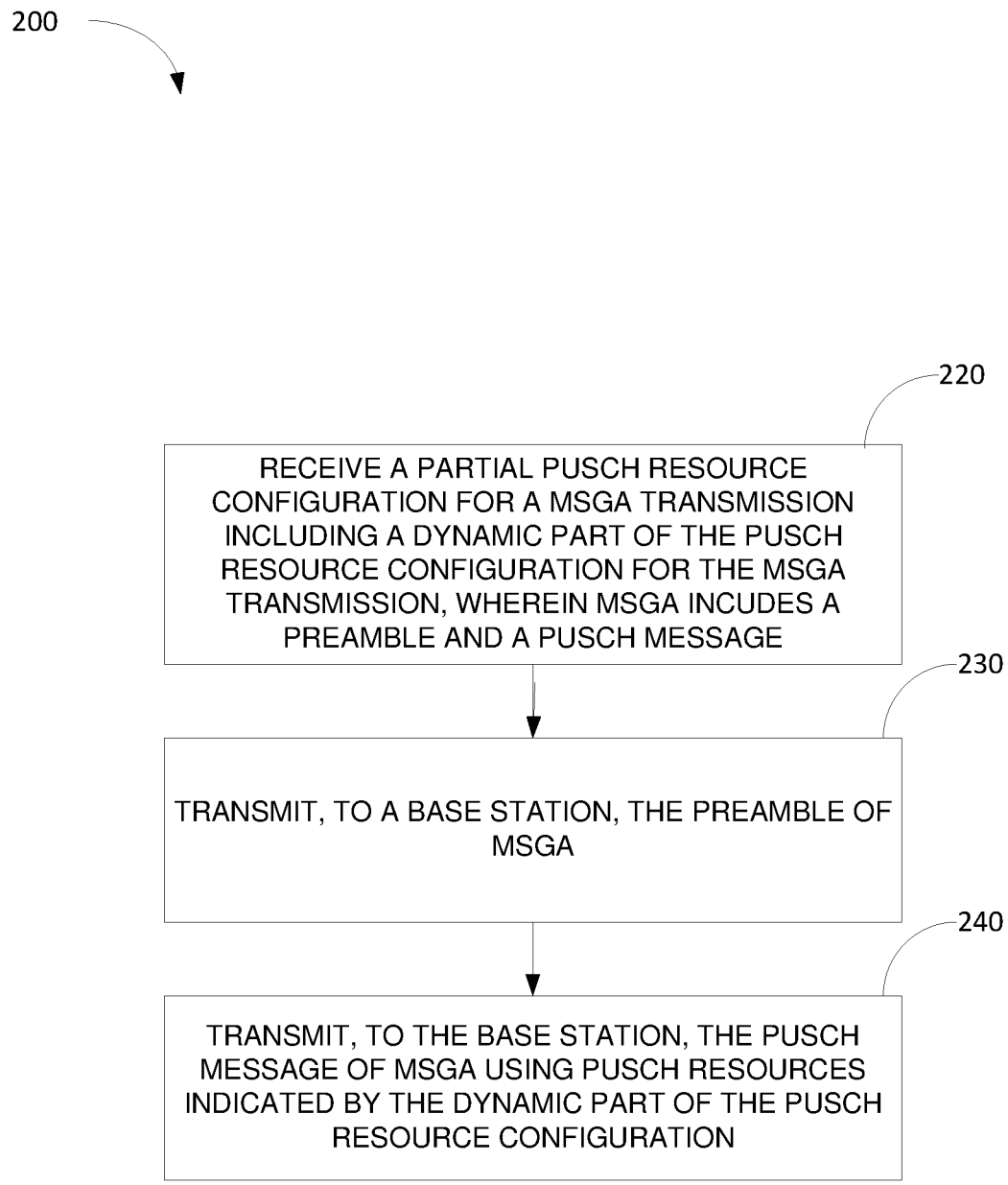
FIG. 13 illustrates a method implemented by a UE of two-step, contention-free random access with partial signaling of PUSCH resource configuration for a msgA transmission.

FIG. 13 illustrates an exemplary method 200 implemented by a UE 120 of performing a two-step, contention-free random access. The UE 120 receives, from the base station 110, a partial Physical Uplink Shared Channel (PUSCH) resource configuration for a Message A (msgA) transmission including a dynamic part of the PUSCH resource configuration for the msgA transmission (block 220). The UE 120 transmits, to a base station, the preamble of msg A transmission on the PRACH (block 230). The UE 120 further transmits to the base station on the PUSCH, the PUSCH message of msgA using PUSCH resources indicated by the dynamic part of the PUSCH resource configuration. (block 240).

In some embodiments of the method 200, the dynamic part of the PUSCH resource configuration comprises a time domain resource allocation.

In some embodiments of the method 200, the time domain resource allocation is indicated by an offset relative to a random access preamble configuration.

In some embodiments of the method 200, the time domain resource allocation is indicated by an offset relative to a contention based random access configuration.

In some embodiments of the method 200, the time domain resource allocation comprises multiple PUSCH occasions.

In some embodiments of the method 200, the dynamic part of the PUSCH resource configuration comprises a frequency domain resource allocation.

In some embodiments of the method 200, the frequency domain resource allocation is indicated by an offset relative to a random access preamble configuration.

In some embodiments of the method 200, the frequency domain resource allocation is indicated by an offset relative to a contention based random access configuration In some embodiments of the method 200, the dynamic part of the PUSCH resource configuration comprises a demodulation reference signal (DMRS) configuration.

In some embodiments of the method 200, the fixed part of the PUSCH resource configuration comprises a modulation and coding scheme (MCS) configuration.

In some embodiments of the method 200, the dynamic part of the PUSCH resource configuration comprises a unique combination of time, frequency and DMRS resources for msgA transmission.

Figure 14:
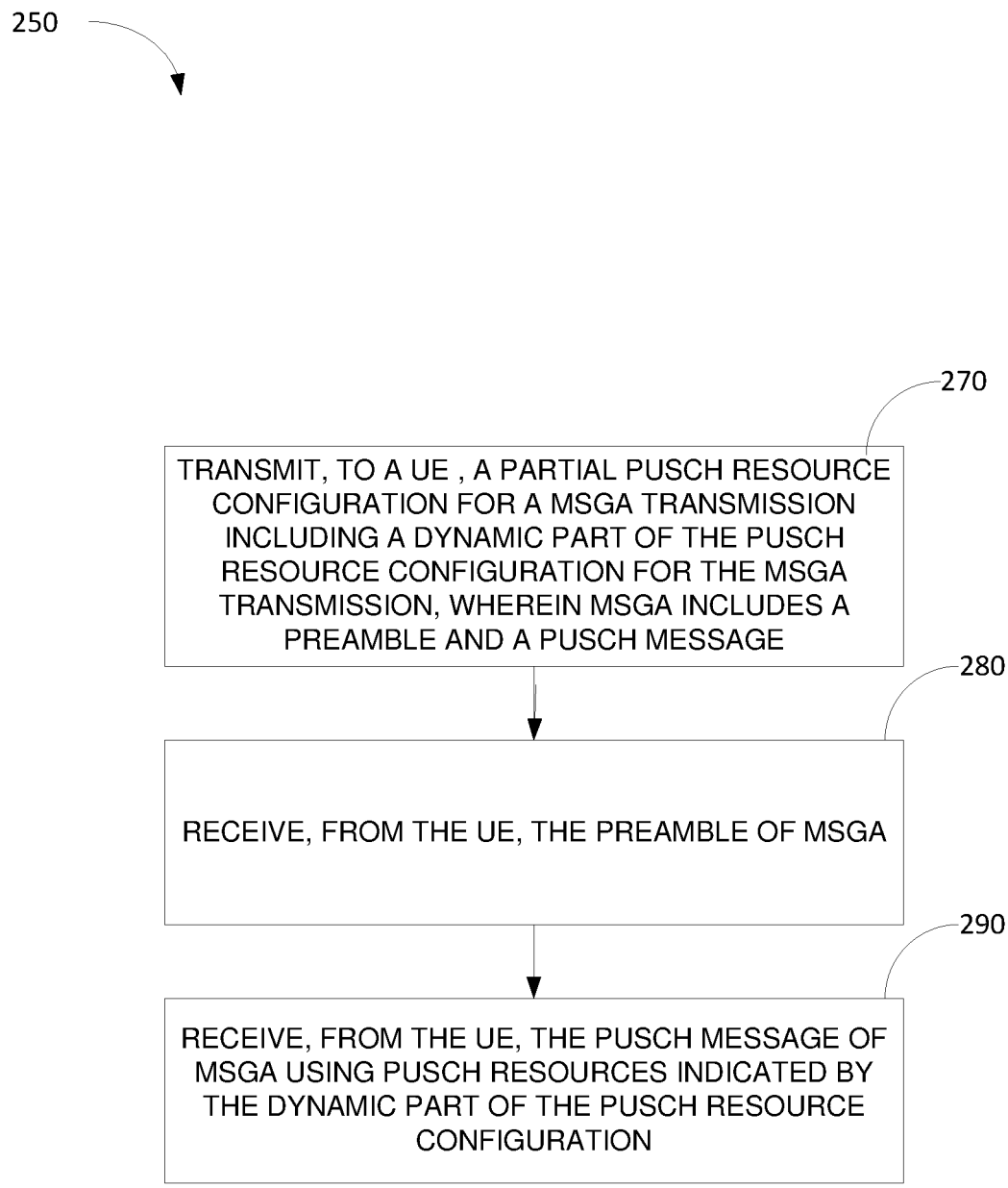
FIG. 14 illustrates a method implemented by a base station of configuring a UE for two-step, contention-free random access with partial signaling of PUSCH resource configuration for a msgA transmission.

FIG. 14 illustrates an exemplary method 250 performed by a base station 110 to support two-step random access according to an embodiment. The base station 110 transmits, to the UE 120, a partial Physical Uplink Shared Channel (PUSCH) resource configuration for a Message A (msgA) transmission including a dynamic part of the PUSCH resource configuration for the msgA transmission (block 270). The base station 110 receives, from the UE 120 on the PRACH, the preamble of msgA on the PRACH (block 280). The base station 110 further from the UE 120 on the PUSCH, the PUSCH message of msgA using PUSCH resources indicated by the dynamic part of the PUSCH resource configuration. (block 290).

In some embodiments of the method 250, the dynamic part of the PUSCH resource configuration comprises a time domain resource allocation.

In some embodiments of the method 250, the time domain resource allocation is indicated by an offset relative to a random access preamble configuration.

In some embodiments of the method 250, the time domain resource allocation is indicated by an offset relative to a contention based random access configuration.

In some embodiments of the method 250, the time domain resource allocation comprises multiple PUSCH occasions.

In some embodiments of the method 250, the dynamic part of the PUSCH resource configuration comprises a frequency domain resource allocation.

In some embodiments of the method 250, the frequency domain resource allocation is indicated by an offset relative to a random access preamble configuration.

In some embodiments of the method 250, the frequency domain resource allocation is indicated by an offset relative to a contention based random access configuration In some embodiments of the method 250, the dynamic part of the PUSCH resource configuration comprises a demodulation reference signal (DMRS) configuration.

In some embodiments of the method 250, the dynamic part of the PUSCH resource configuration comprises a modulation and coding scheme (MCS) configuration.

In some embodiments of the method 250, the dynamic part of the PUSCH resource configuration comprises a unique combination of time, frequency and DMRS resources for msgA transmission.

Figure 15:
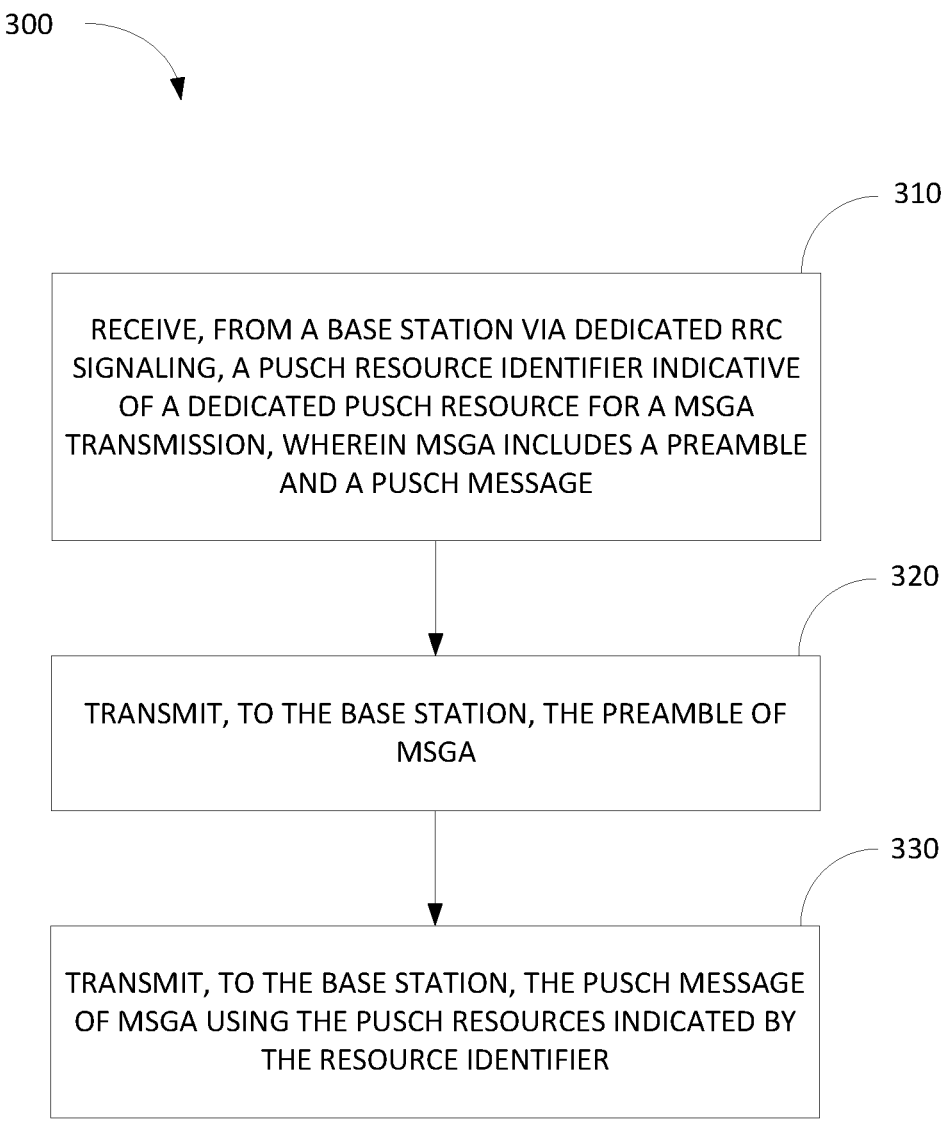
FIG. 15 illustrates a method implemented by a UE of two-step, contention-free random access with signaling of PRU for msgA transmission.

FIG. 15 illustrates an exemplary method 300 implemented by a UE 120 of performing a two-step, contention-free random access. The UE 120 receives, from a base station 110 via dedicated RRC signaling, a Physical Uplink Shared Channel (PUSCH) resource identifier indicative of a dedicated PUSCH resource for a msgA transmission, wherein Message A includes a preamble and a PUSCH message (block 310). The UE 120 transmits, to the base station 110, the preamble of msgA (block 320). The UE 120 transmits, to the base station 110, the PUSCH message of msgA using the PUSCH resources indicated by the resource identifier. (block 330).

In some embodiments of the method 300, the resource identifier indicates a time domain resource allocation.

In some embodiments of the method 300, the time domain resource allocation comprises multiple PUSCH occasions.

In some embodiments of the method 300, the resource identifier indicates a frequency domain resource allocation.

In some embodiments of the method 300, the resource identifier indicates a PUSCH occasion and associated demodulation reference signal (DMRS) configuration for the PUSCH occasion.

In some embodiments of the method 300, the resource identifier indicates a modulation and coding scheme (MCS) configuration.

In some embodiments of the method 300, the resource identifier indicates a unique combination of time, frequency and DMRS resources for msgA transmission.

Figure 16:
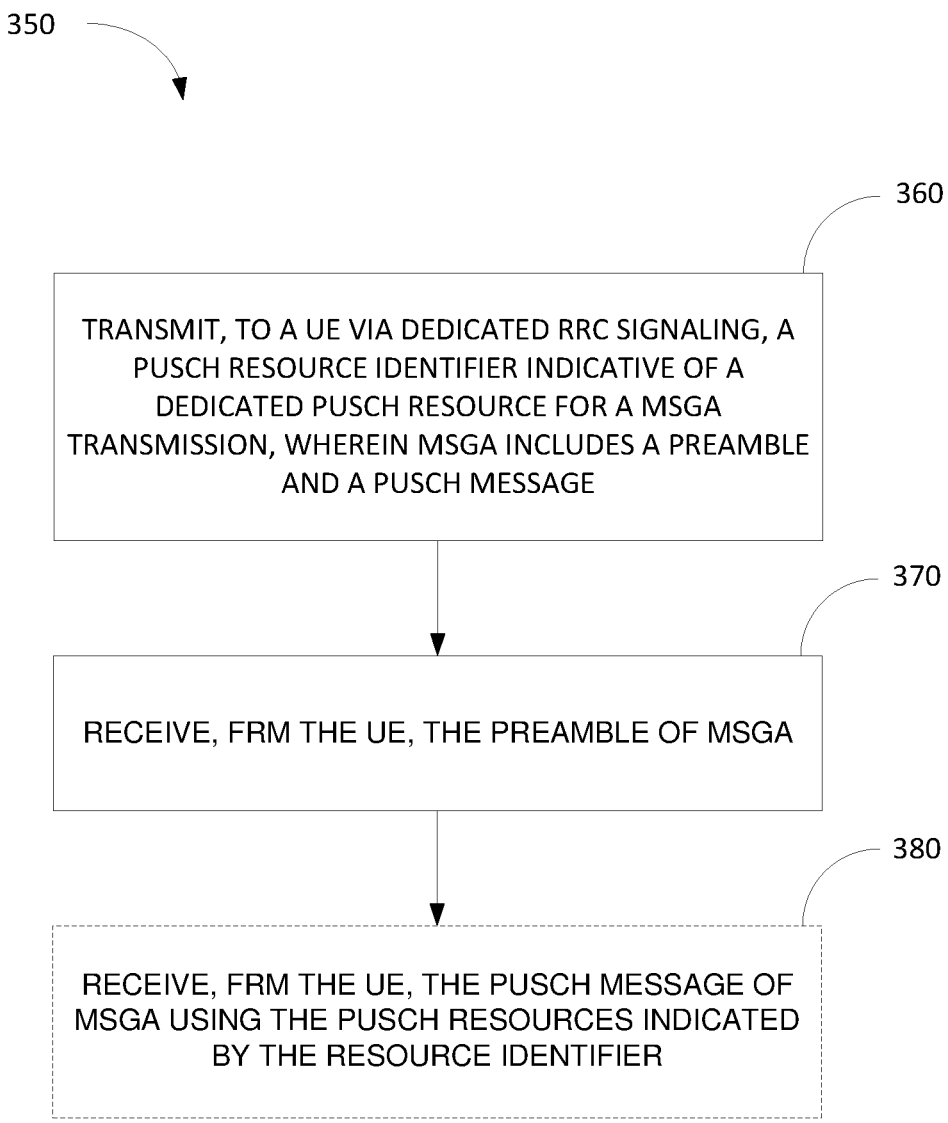
FIG. 16 illustrates a method implemented by a base station of configuring a UE for two-step, contention-free random access with signaling of PRU for msgA transmission.

FIG. 16 illustrates an exemplary method 350 performed by a base station 110 to support two-step random access according to an embodiment. The base station 110 transmits, to a UE 120 via dedicated RRC signaling, a Physical Uplink Shared Channel (PUSCH) indicative of a dedicated PUSCH resource for a msgA transmission, wherein msgA includes a preamble and a PUSCH message (block 360). The base station 110 receives, from the UE 110 on the PRACH, the preamble of msgA (block 370). The base station 110 receives, from the UE 110, the PUSCH message of msgA using the PUSCH resources indicated by the resource identifier. (block 380).

In some embodiments of the method 350, the resource identifier indicates a time domain resource allocation.

In some embodiments of the method 350, the time domain resource allocation comprises multiple PUSCH occasions.

In some embodiments of the method 350, the resource identifier indicates a frequency domain resource allocation.

In some embodiments of the method 350, the resource identifier indicates a demodulation reference signal (DMRS) configuration.

In some embodiments of the method 350, the resource identifier indicates a modulation and coding scheme (MCS) configuration.

In some embodiments of the method 350, the resource identifier indicates a unique combination of time, frequency and DMRS resources for msgA transmission.

An apparatus can perform any of the methods herein described by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 17:
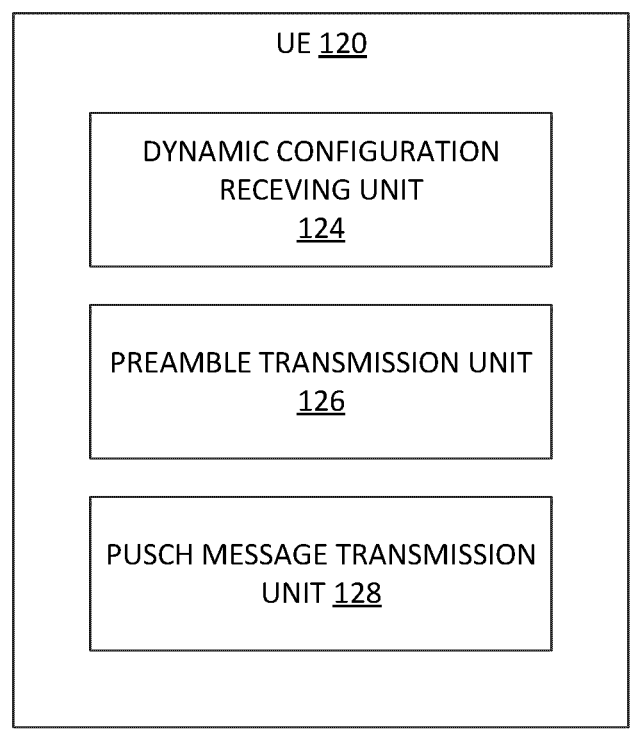
FIG. 17 illustrates a UE configured for two-step, contention-free random access with partial signaling of PUSCH resource configuration for a msgA transmission.

FIG. 17 illustrates a UE 120 in accordance with one or more embodiments. The UE 120 comprises a dynamic configuration receiving unit 124, a preamble transmission unit 126 and a PUSCH message transmission unit 128. The various units 124-128 can be implemented by hardware and/or by software code that is executed by one or more processors or processing circuits. The dynamic configuration receiving unit 124 is configured to receive a partial PUSCH resource configuration for a msgA transmission including a dynamic part of the PUSCH resource configuration for the msgA transmission. The preamble transmission unit 126 is configured to transmit, to a base station 110, the preamble of msgA. The PUSCH message transmission unit 128, is configured to transmit, to the base station 110, the PUSCH message of msgA using PUSCH resources indicated by the dynamic part of the PUSCH resource configuration.

Figure 18:
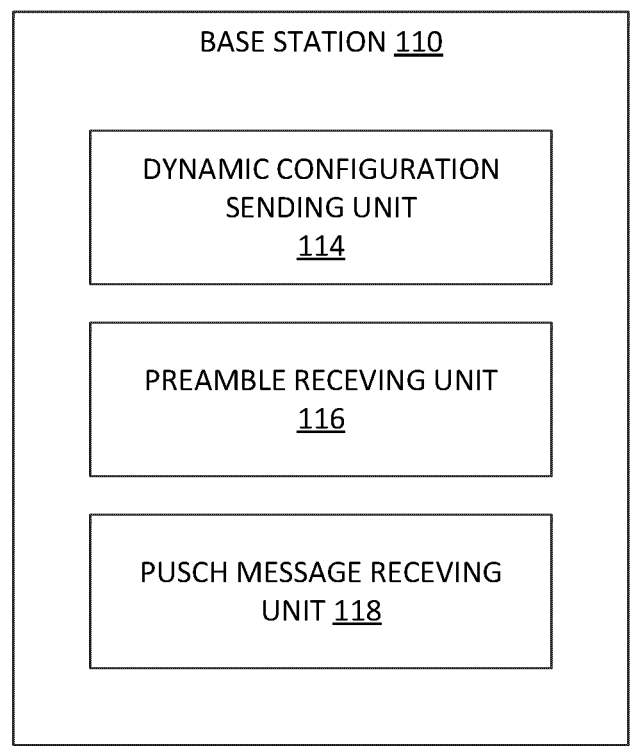
FIG. 18 illustrates a base station configured for two-step, contention-free random access with partial signaling of PUSCH resource configuration for a msgA transmission.

FIG. 18 illustrates a base station 110 in accordance with one or more embodiments. The base station 110 comprises a dynamic configuration sending unit 114, a preamble receiving unit 116 and a PUSCH message receiving unit 118. The units 114-118 can be implemented by hardware and/or by software code that is executed by a processor or processing circuit. The dynamic configuration sending signaling unit 114 is configured to transmit a partial PUSCH resource configuration for a msgA transmission including a dynamic part of the PUSCH resource configuration for the msgA transmission. The preamble receiving unit 116 is configured to receive, from the UE 120, the preamble of msgA. The PUSCH message receiving unit 118 is configured to receive, from the UE 120, the PUSCH message of msgA using PUSCH resources indicated by the dynamic part of the PUSCH resource configuration.

Figure 19:
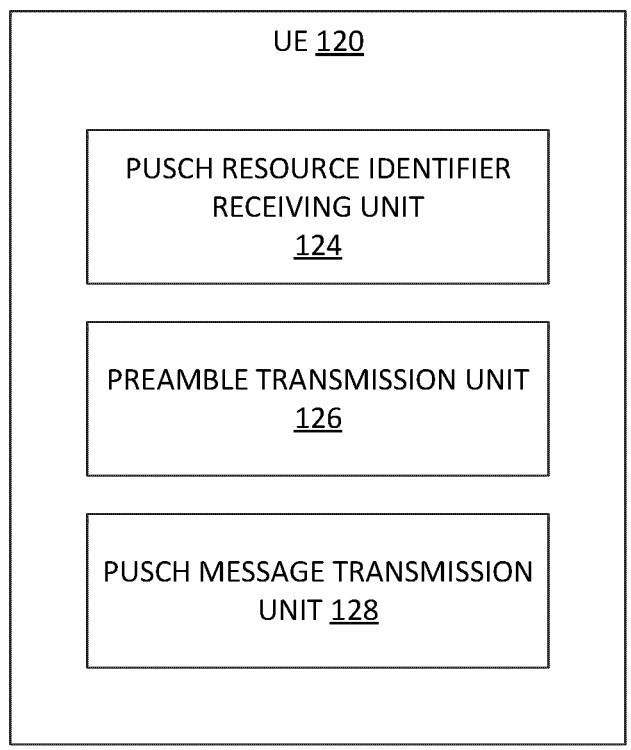
FIG. 19 illustrates a UE configured for two-step, contention-free random access with signaling of PRU for msgA transmission.

FIG. 19 illustrates a UE 120 in accordance with one or more embodiments. The UE 120 comprises a RRC receiving unit 124, a preamble transmission unit 126 and a PUSCH message transmission unit 128. The various units 124-128 can be implemented by hardware and/or by software code that is executed by one or more processors or processing circuits. The PUSCH resource identifier receiving unit 124 is configured to receive, via dedicated RRC signaling, a resource identifier indicative of a dedicated PUSCH resource for a msgA transmission, wherein msgA includes a preamble and a PUSCH message. The preamble transmission unit 126 is configured to transmit, to the base station 110, the preamble of msgA. The PUSCH message transmission unit 128, is configured to transmit, to the base station 110, the PUSCH message of msgA using the PUSCH resources indicated by the resource identifier.

Figure 20:
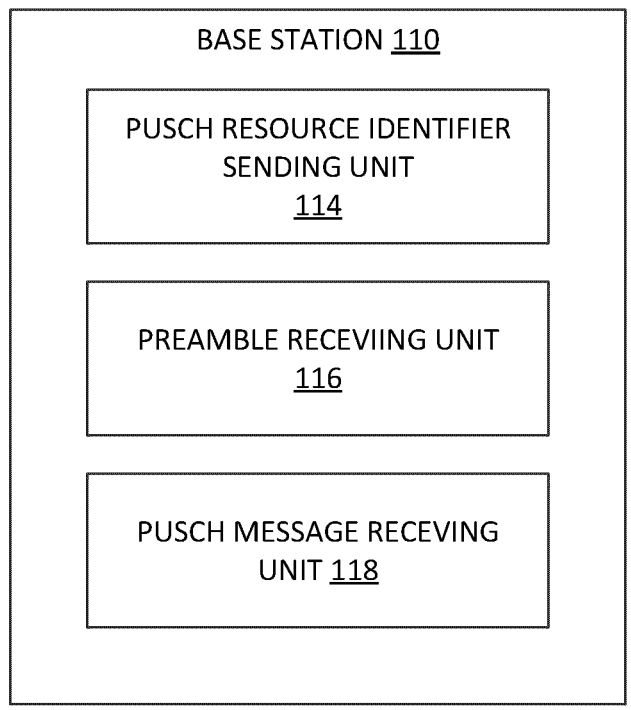
FIG. 20 illustrates station configured for two-step, contention-free random access with signaling of PRU for msgA transmission.

FIG. 20 illustrates a base station 110 in accordance with one or more embodiments. The base station 110 comprises a PUSCH resource identifier sending unit 114, a preamble receiving unit 116 and a PUSCH message receiving unit 118. The units 114-118 can be implemented by hardware and/or by software code that is executed by a processor or processing circuit. The PUSCH resource identifier sendingunit 114 is configured to transmit, via dedicated Radio Resource Control (RRC) signaling, a PUSCH resource identifier indicative of a dedicated Physical Uplink Shared Channel (PUSCH) resource for a msgA transmission, wherein msgA includes a preamble and a PUSCH message. The preamble receiving unit 116 is configured to receive, from the UE 120, the preamble of msgA. The PUSCH message transmission unit 118, is configured to receive, from the UE 120, the PUSCH message of msgA using the PUSCH resources indicated by the resource identifier.

Figure 21:
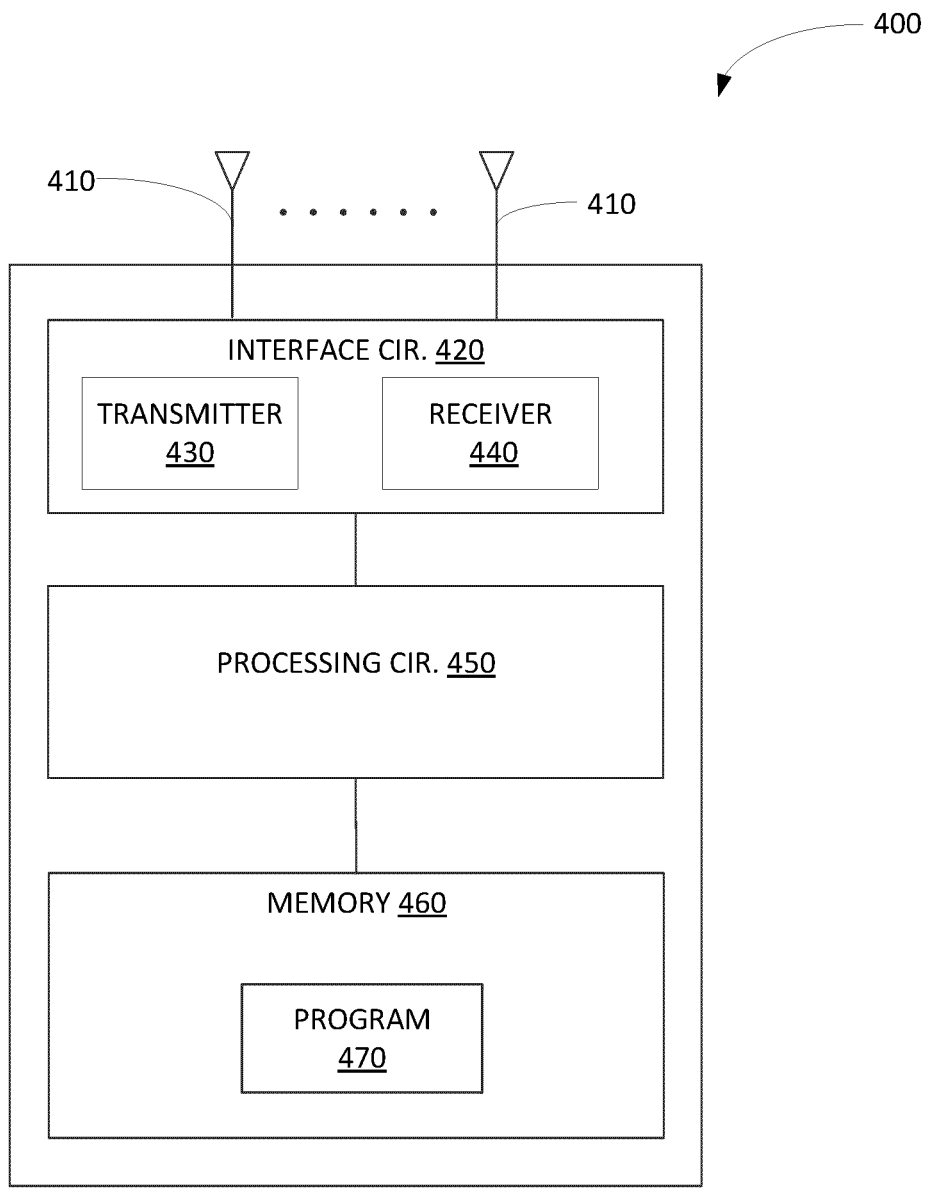
FIG. 21 illustrates the main functional components of an exemplary UE configured to perform two-step, contention-free random access.

FIG. 21 illustrates a UE 400 according to another embodiment. The UE 400 comprises one or more antennas 410, communication circuitry 420, processing circuitry 450, and memory 440.

The communication circuitry 420 is coupled to the antennas 410 and comprises the radio frequency (RF) circuitry (e.g., transmitter 430 and receiver 440) needed for transmitting and receiving signals over a wireless communication channel. The transmitter 430 and receiver 440 may, for example, be configured to operate according to the NR standard.

The processing circuitry 450 controls the overall operation of the UE 400 and is configured to perform the random access methods as herein described including the methods 200 and 300 shown in FIGS. 13 and 15 respectively. Such processing includes coding and modulation of transmitted data signals, and the demodulation and decoding of received data signals. The processing circuitry 450 may comprise one or more microprocessors, hardware, firmware, or a combination thereof. The processing circuitry is configured to perform the random access procedures as herein described.

Memory 460 comprises both volatile and non-volatile memory for storing computer program code and data needed by the processing circuitry 470 for operation. Memory 460 may comprise any tangible, non-transitory computer-readable storage medium for storing data including electronic, magnetic, optical, electromagnetic, or semiconductor data storage. Memory 460 stores a computer program 470 comprising executable instructions that configure the processing circuitry 450 to implement the methods as herein described including the methods 200 and 300 shown in FIGS. 13 and 15 respectively. A computer program 470 in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 470 for configuring the processing circuitry 450 as herein described may be stored in a removable memory, such as a portable compact disc, portable digital video disc, or other removable media. The computer program 470 may also be embodied in a carrier such as an electronic signal, optical signal, radio signal, or computer readable storage medium.

Figure 22:
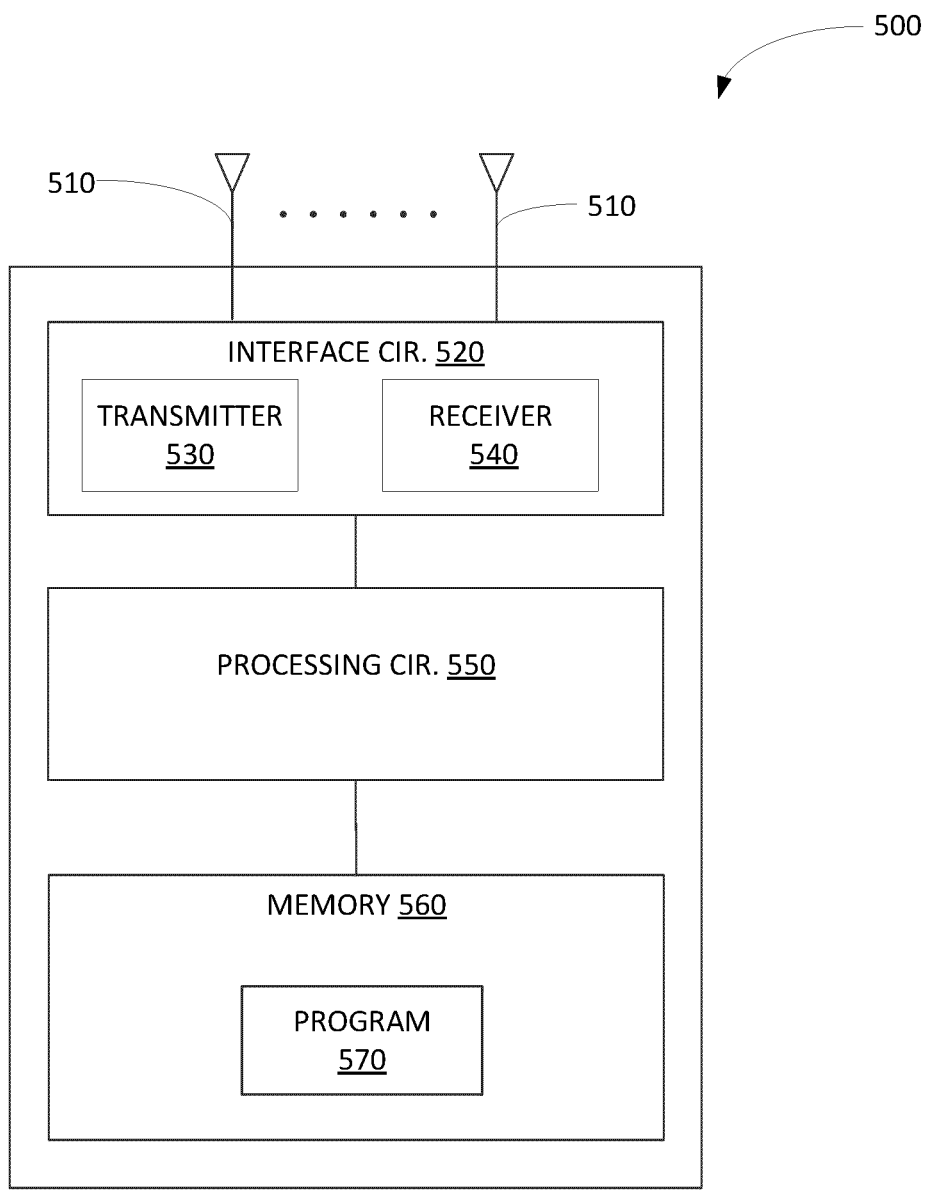
FIG. 22 illustrates the main functional components of a base station configured to support two-step, contention-free random access.

FIG. 22 illustrates a base station 500 according to another embodiment. The base station 500 comprises one or multiple antenna 510, communication circuitry 520, processing circuitry 550, and memory 540.

The communication circuitry 520 is coupled to the antennas 510 and comprises the radio frequency (RF) circuitry (e.g., transmitter 530 and receiver 540) needed for transmitting and receiving signals over a wireless communication channel. The transmitter 530 and receiver 540 may, for example, be configured to operate according to the NR standard.

The processing circuitry 550 controls the overall operation of the base station 500 and is configured to perform the random access methods as herein described including the methods 250 and 350 shown in FIGS. 14 and 16 respectively. The processing circuitry 550 may comprise one or more microprocessors, hardware, firmware, or a combination thereof. The processing circuitry is configured to perform the random access procedures as herein described.

Memory 560 comprises both volatile and non-volatile memory for storing computer program code and data needed by the processing circuitry 550 for operation. Memory 560 may comprise any tangible, non-transitory computer-readable storage medium for storing data including electronic, magnetic, optical, electromagnetic, or semiconductor data storage. Memory 560 stores a computer program 570 comprising executable instructions that configure the processing circuitry 550 to implement the methods as herein described including the methods 250 and 350 shown in FIGS. 14 and 16 respectively. A computer program 570 in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 550 for configuring the processing circuitry 550 as herein described may be stored in a removable memory, such as a portable compact disc, portable digital video disc, or other removable media. The computer program 570 may also be embodied in a carrier such as an electronic signal, optical signal, radio signal, or computer readable storage medium. Those skilled in the art will also appreciate that embodiments herein further include corresponding computer programs. A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Additional Embodiments

Figure 23:
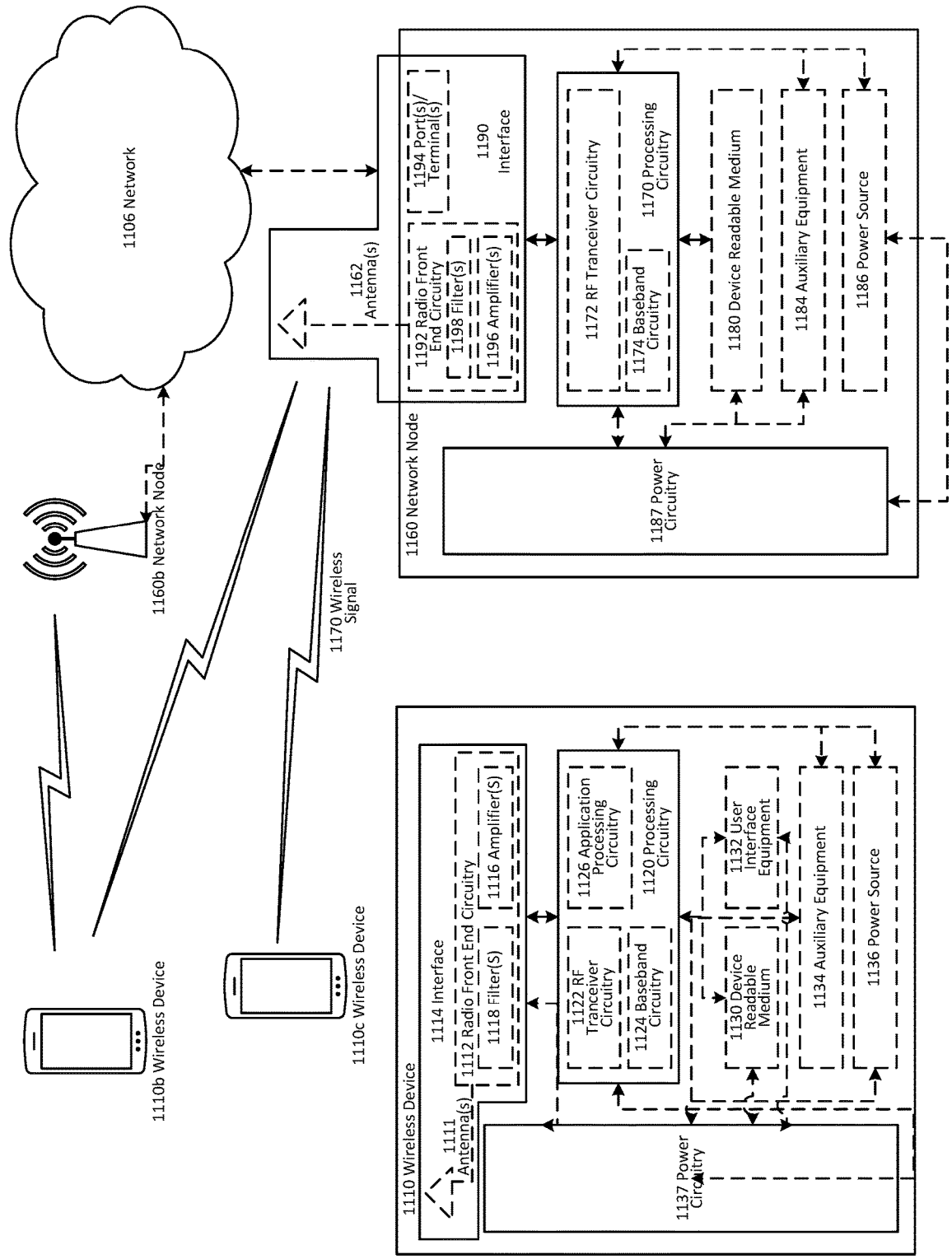
FIG. 23 illustrates an exemplary wireless network according to an embodiment.

Although the subject matter described herein may be implemented in any appropriate type of system using any suitable components, the embodiments disclosed herein are described in relation to a wireless network, such as the example wireless network illustrated in FIG. 23. For simplicity, the wireless network of FIG. 23 only depicts network 1106, network nodes 1160 and 1160b, and WDs 1110, 1110b, and 1110c. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), and base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 23, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 23 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units.

In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160 but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signaling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170.

In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 23 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110 and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 24:
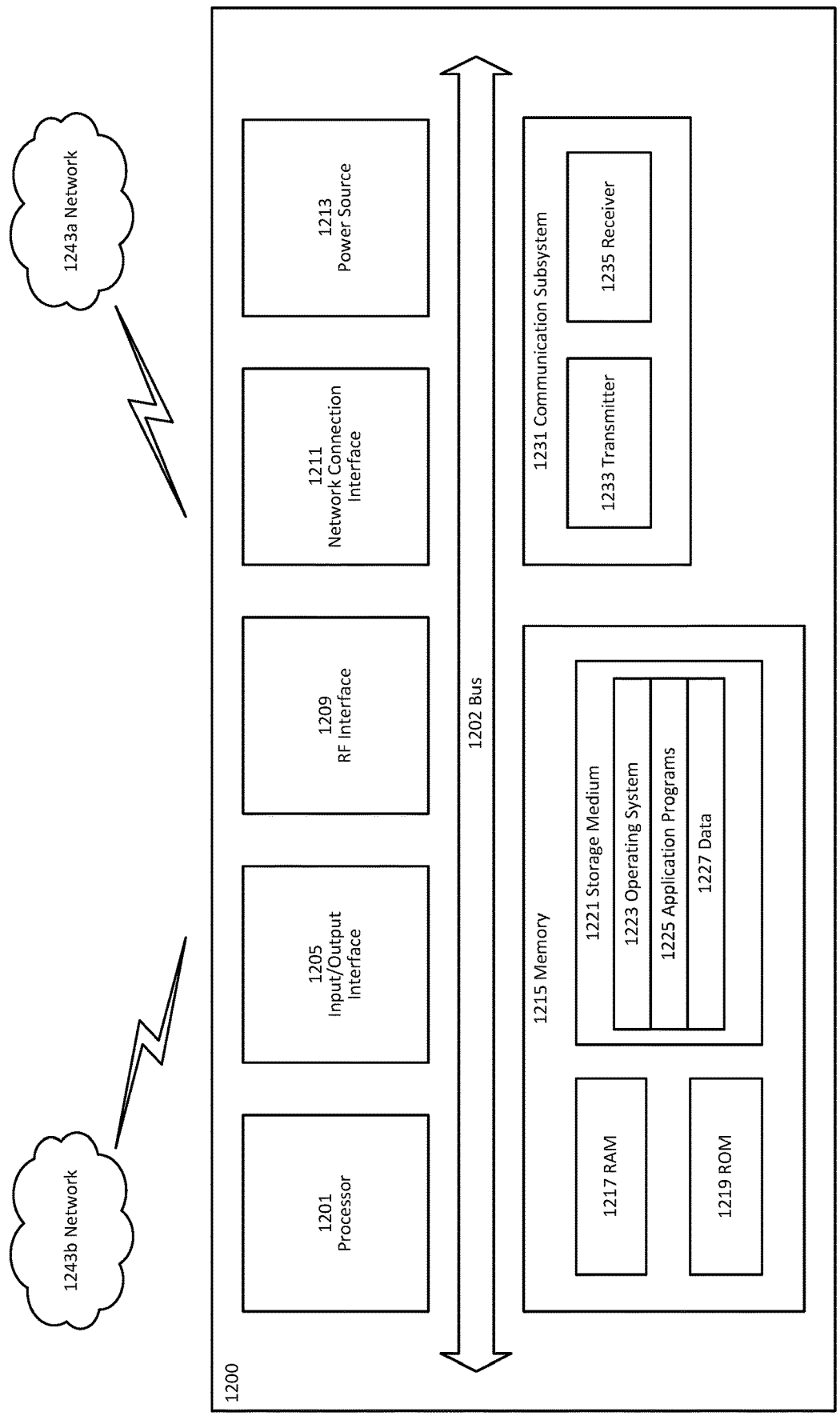
FIG. 24 illustrates an exemplary UE according to an embodiment.

FIG. 24 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1200 may be any UE identified by the 3rd Generation Partnership Project (3GPP), including a NB-IoT UE, a machine type communication (MTC) UE, and/or an enhanced MTC (eMTC) UE. UE 1200, as illustrated in FIG. 24, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 24 is a UE, the components discussed herein are equally applicable to a WD, and vice-versa.

In FIG. 24, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 24, or only a subset of the components. The level of integration between the components may vary from one UE to another UE. Further, certain UEs may contain multiple instances of a component, such as multiple processors, memories, transceivers, transmitters, receivers, etc.

In FIG. 24, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 24, RF interface 1209 may be configured to provide a communication interface to RF components such as a transmitter, a receiver, and an antenna. Network connection interface 1211 may be configured to provide a communication interface to network 1243*a*. Network 1243*a* may encompass wired and/or wireless networks such as a local-area network (LAN), a wide-area network (WAN), a computer network, a wireless network, a telecommunications network, another like network or any combination thereof. For example, network 1243*a* may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 24, processing circuitry 1201 may be configured to communicate with network 1243*b* using communication subsystem 1231. Network 1243*a* and network 1243*b* may be the same network or networks or different network or networks. Communication subsystem 1231 may be configured to include one or more transceivers used to communicate with network 1243b. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243b may encompass wired and/or wireless networks such as a local-area network (LAN), a wide-area network (WAN), a computer network, a wireless network, a telecommunications network, another like network or any combination thereof. For example, network 1243b may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 25:
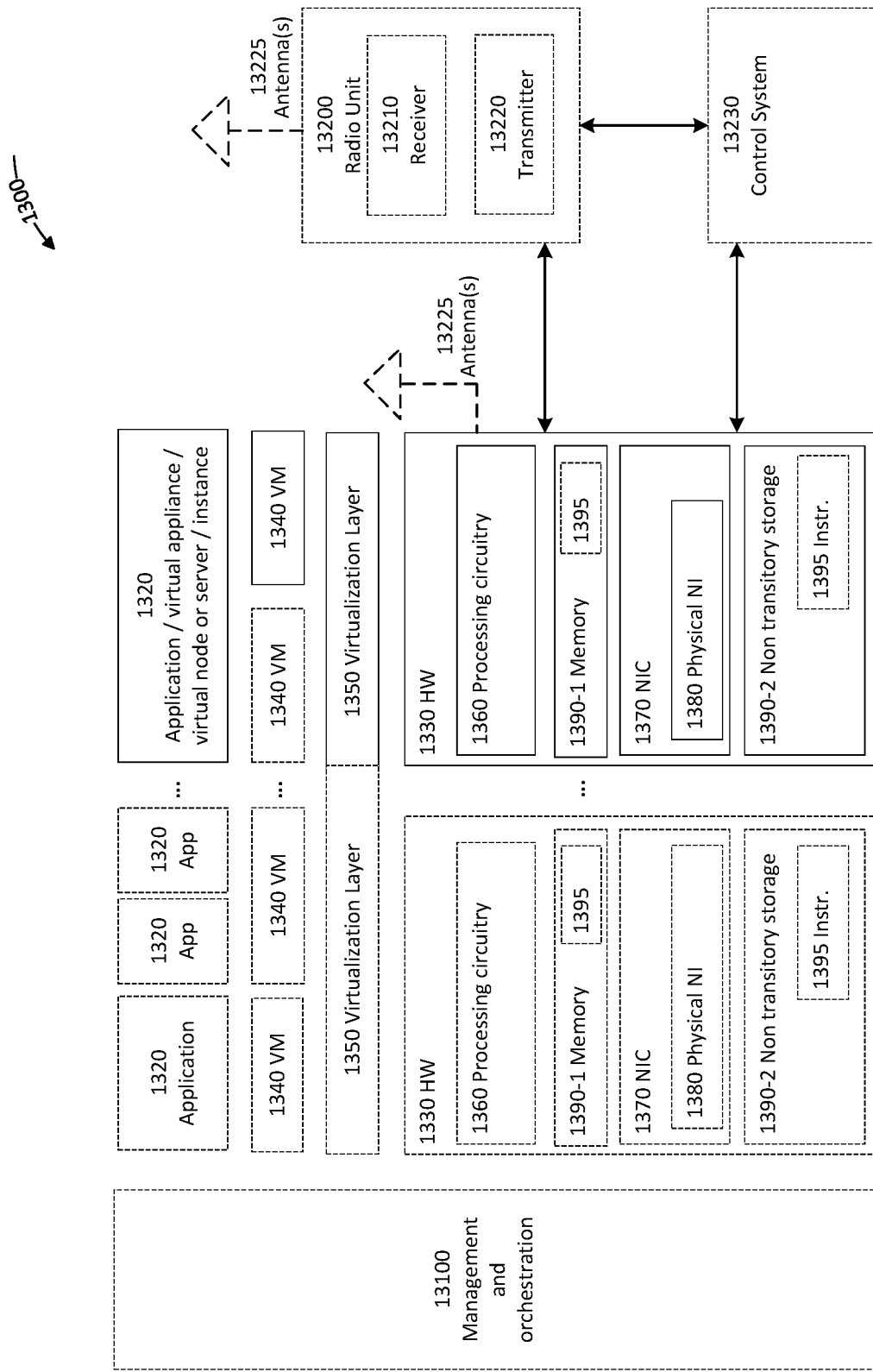
FIG. 25 illustrates an exemplary virtualization environment according to an embodiment.

FIG. 25 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio base station) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio base station or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 25, hardware 1330 may be a standalone network node with generic or specific components. Hardware 1330 may comprise antenna 13225 and may implement some functions via virtualization. Alternatively, hardware 1330 may be part of a larger cluster of hardware (e.g., such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 25.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio base station or a base station.

In some embodiments, some signaling can be affected with the use of control system 13230 which may alternatively be used for communication between the hardware nodes 1330 and radio units 13200.

Figure 26:
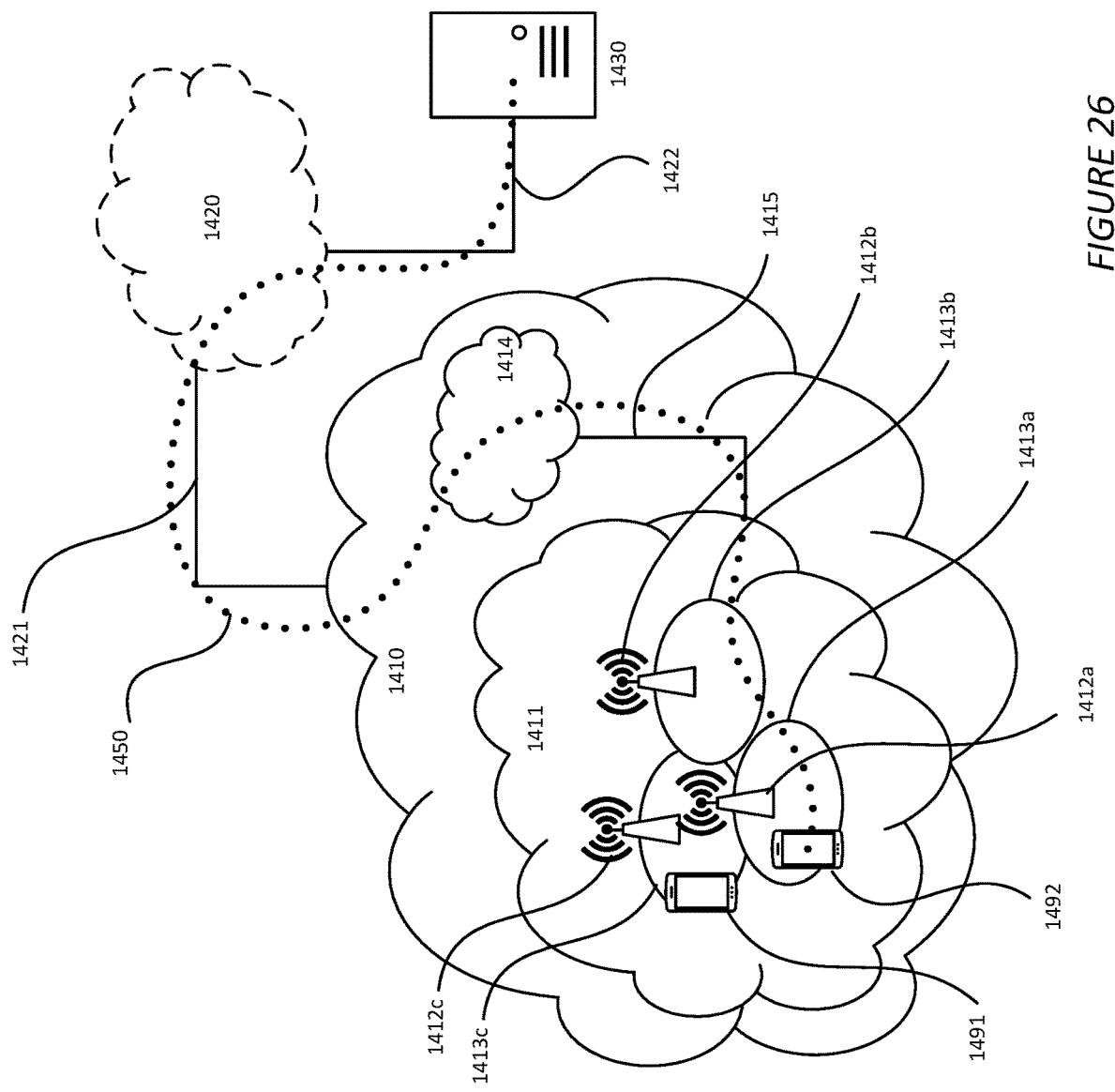
FIG. 26 illustrates an exemplary telecommunication network connected via an intermediate network to a host computer according to an embodiment.

FIG. 26 illustrates a telecommunication network connected via an intermediate network to a host computer in accordance with some embodiments. In particular, with reference to FIG. 26, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c is configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, and a distributed server or as processing resources in a server farm. Host computer 1430 may be under the ownership or control of a service provider or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 26 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 27:
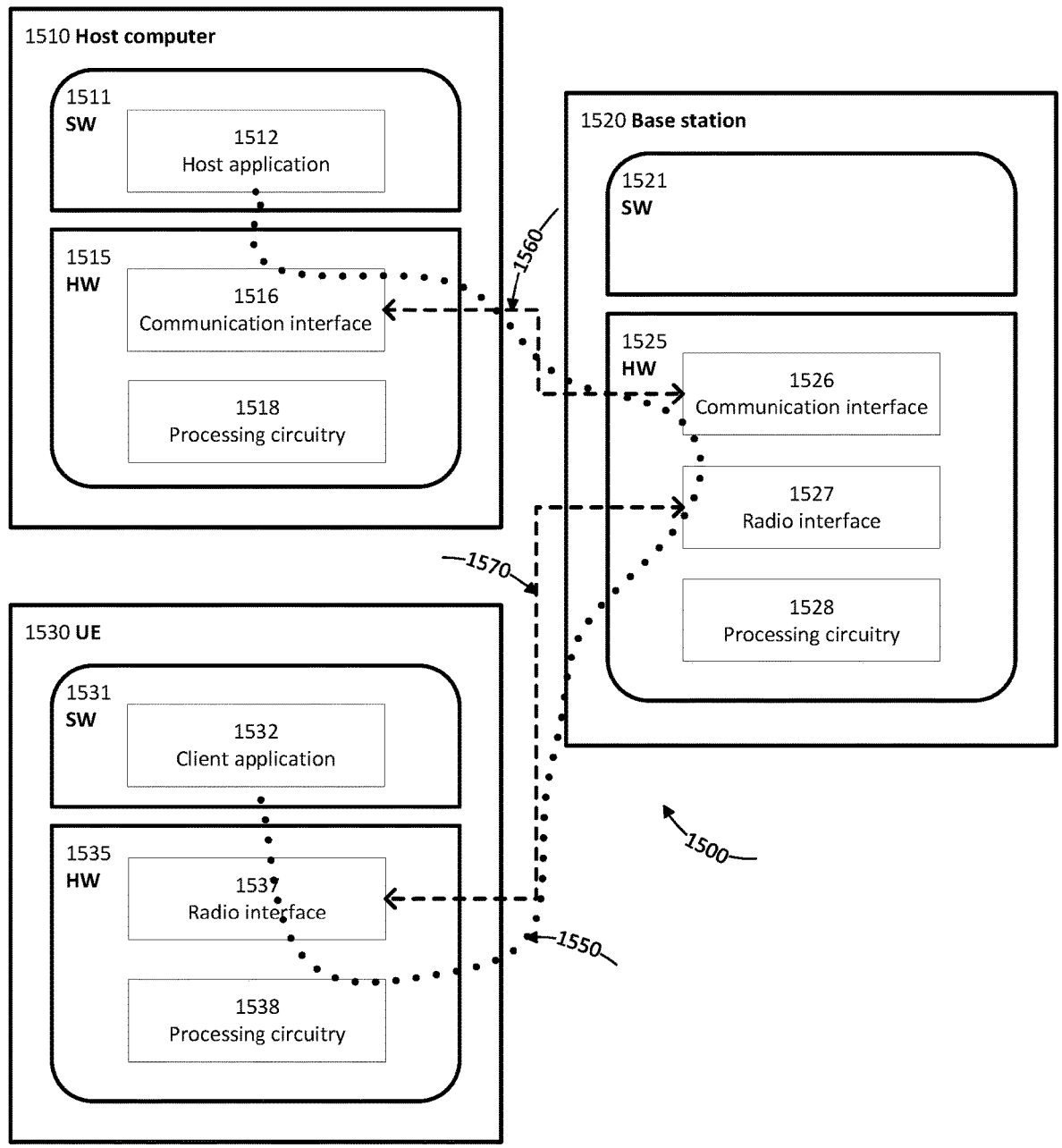
FIG. 27 illustrates an exemplary host computer communicating via a base station with a user equipment over a partially wireless connection according to an embodiment.

Example implementations, in accordance with an embodiment, of the UE, base station and host computer discussed in the preceding paragraphs will now be described with reference to FIG. 27. FIG. 27 illustrates host computer communicating via a base station with a user equipment over a partially wireless connection in accordance with some embodiments In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 27) served by base station 1520. Communication interface 1526 may be configured to facilitate connection 1560 to host computer 1510. Connection 1560 may be direct or may pass through a core network (not shown in FIG. 27) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. It's hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 27 may be similar or identical to host computer 1430, one of base stations 1412a, 1412b, 1412c and one of UEs 1491, 1492 of FIG. 26, respectively. This is to say, the inner workings of these entities may be as shown in FIG. 27 and independently, the surrounding network topology may be that of FIG. 26.

In FIG. 27, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may reduce power consumption in MTC devices and thereby provide benefits such as longer service life for MTC devices without replacement or change of batteries.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 28:
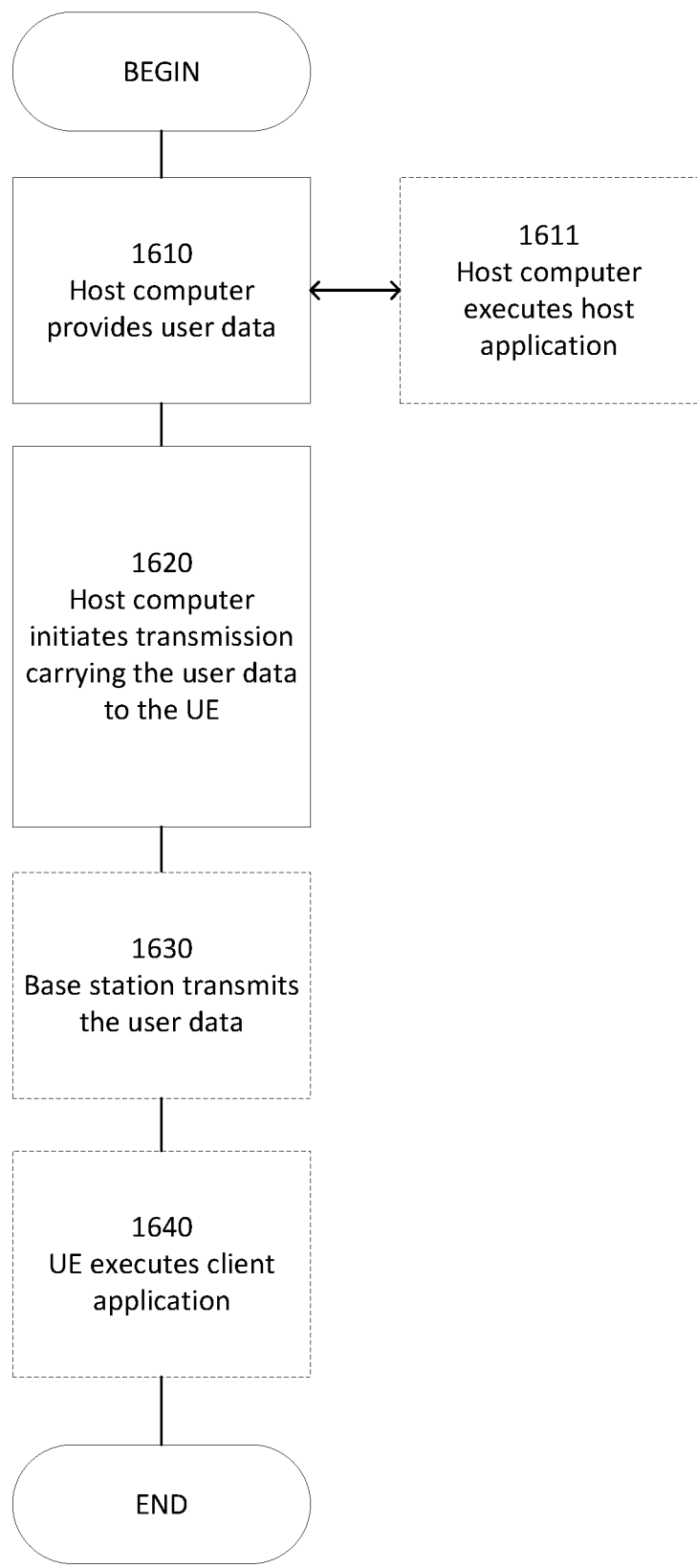
FIGS. 28-31 illustrate an exemplary method implemented in a communication system, according to an embodiment.

FIG. 28 is a flowchart illustrating a method implemented in a communication system, in accordance with one embodiment. The communication system includes a host computer, a base station and a UE which may be those described with reference to FIGS. 26 and 27. For simplicity of the present disclosure, only drawing references to FIG. 28 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 29:
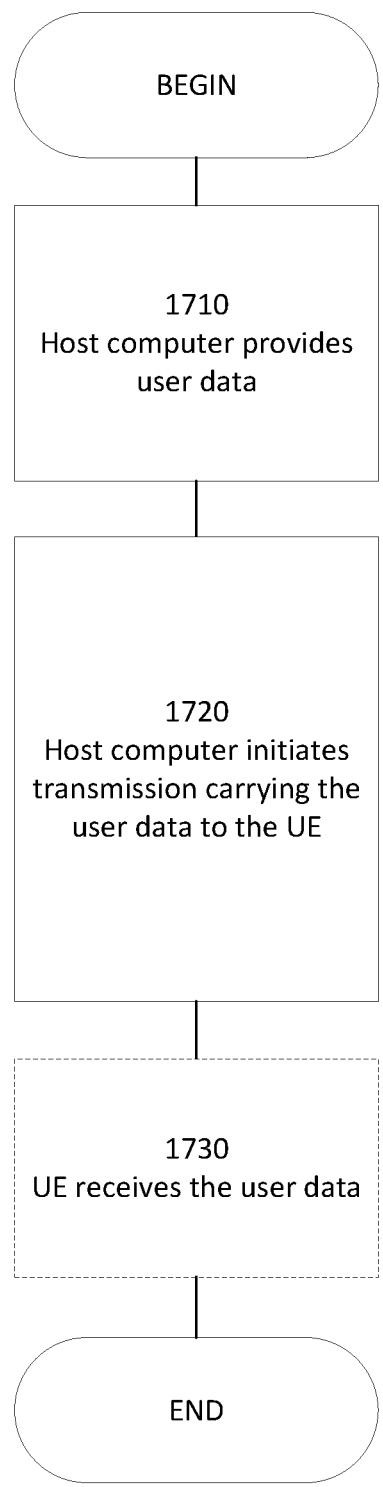

FIG. 29 is a flowchart illustrating a method implemented in a communication system, in accordance with one embodiment. The communication system includes a host computer, a base station and a UE which may be those described with reference to FIGS. 26 and 27. For simplicity of the present disclosure, only drawing references to FIG. 29 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 30:
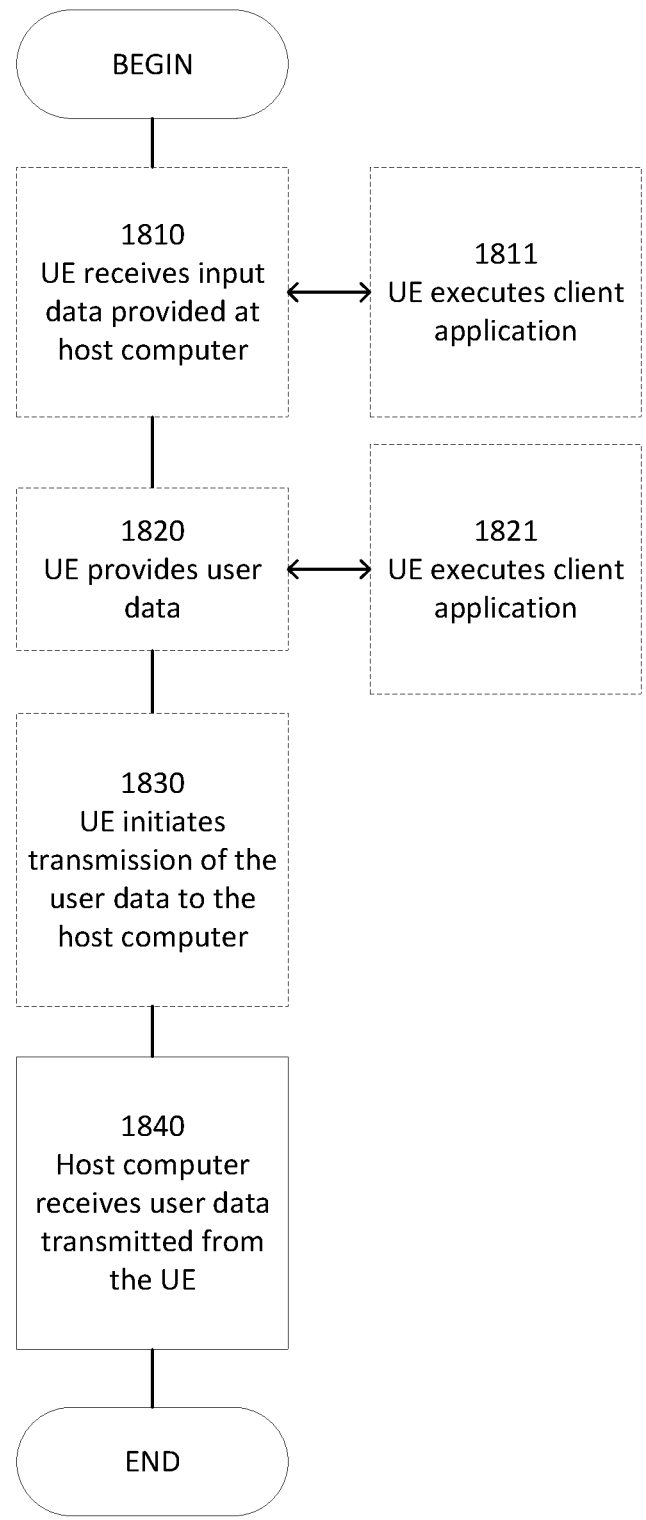

FIG. 30 is a flowchart illustrating a method implemented in a communication system, in accordance with one embodiment. The communication system includes a host computer, a base station and a UE which may be those described with reference to FIGS. 26 and 27. For simplicity of the present disclosure, only drawing references to FIG. 30 will be included in this section. In step 1810 (which may be optional), the UE receives input data provided by the host computer. Additionally, or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 31:
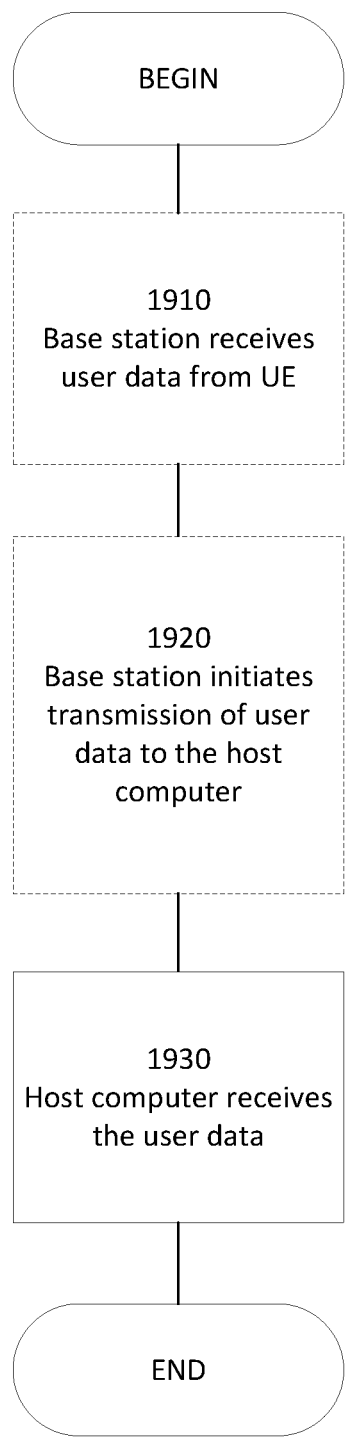

FIG. 31 is a flowchart illustrating a method implemented in a communication system, in accordance with one embodiment. The communication system includes a host computer, a base station and a UE which may be those described with reference to FIGS. 26 and 27. For simplicity of the present disclosure, only drawing references to FIG. 31 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Additional information may be found in Appendix A, which is incorporated in its entirety by reference.

What is claimed is:

1. A method implemented by a user equipment (UE) of performing two-step, contention-free random access, the method comprising:
receiving a partial Physical Uplink Shared Channel (PUSCH) resource configuration for a Message A (msgA) transmission including a dynamic part of the PUSCH resource configuration for the msgA transmission, the partial PUSCH resource configuration being less than a complete msgA PUSCH resource configuration, the dynamic part of the PUSCH resource configuration comprising a demodulation reference signal (DMRS) configuration;
transmitting, to a base station, the preamble of msgA; and
transmitting, to the base station, the PUSCH message of msgA using PUSCH resources indicated by the dynamic part of the PUSCH resource configuration.

2. The method of claim 1, wherein the dynamic part of the PUSCH resource configuration comprises one of:
a time domain resource allocation; or
a frequency domain resource allocation.

3. The method of claim 2, wherein the time domain resource allocation is indicated by an offset relative to one of:
a random access preamble configuration; or
a contention based random access configuration.

4. The method of claim 1, wherein the time domain resource allocation comprises multiple PUSCH occasions.

5. The method of claim 1, wherein the dynamic part of the PUSCH resource configuration comprises a modulation and coding scheme (MCS) configuration.

6. A method implemented by a base station of supporting two-step, contention-free random access, the method comprising:
transmitting, to a user equipment (UE), a partial Physical Uplink Shared Channel (PUSCH) resource configuration for a Message A (msgA) transmission including a dynamic part of the PUSCH resource configuration for the msgA transmission, the partial PUSCH resource configuration being less than a complete msgA PUSCH resource configuration, the dynamic part of the PUSCH resource configuration comprising a demodulation reference signal (DMRS) configuration;

receiving, from the UE, the preamble of msgA; and receiving, from the UE, the PUSCH message of msgA using PUSCH resources indicated by the dynamic part of the PUSCH resource configuration.

7. The method of claim 6, wherein the dynamic part of the PUSCH resource configuration comprises one of:

a time domain resource allocation; or a frequency domain resource allocation.

8. The method of claim 7, wherein the time domain resource allocation is indicated by an offset relative to a random access preamble configuration.

9. The method of claim 6, wherein the time domain resource allocation comprises multiple PUSCH occasions.

10. The method of claim 7, wherein the frequency domain resource allocation is indicated by an offset relative to a random access preamble configuration.

11. A user equipment (UE) configured to perform two-step, contention-free random access, the UE comprising:

communication circuitry configured for communication with a base station over a wireless communication channel; and processing circuitry configured to, in conjunction with the communication circuitry:

receive a partial Physical Uplink Shared Channel (PUSCH) resource configuration for a Message A (msgA) transmission a dynamic part of the PUSCH resource configuration for the msgA transmission, the partial PUSCH resource configuration being less than a complete msgA PUSCH resource configuration, the dynamic part of the PUSCH resource configuration comprising a demodulation reference signal (DMRS) configuration;

transmit, to a base station, the preamble of msgA; and transmit, to the base station, the PUSCH message of msgA using PUSCH resources indicated by the dynamic part of the PUSCH resource configuration.

12. The UE according to claim 11, wherein the dynamic part of the PUSCH resource configuration comprises one of:

a time domain resource allocation; or a frequency domain resource allocation.

13. A base station configured to support two-step, contention-free random access, the base station comprising:

communication circuitry configured for communication with a user equipment (UE) over a wireless communication channel; and processing circuitry configured to, in conjunction with the communication circuitry:

transmit, to a user equipment (UE) a partial Physical Uplink Shared Channel (PUSCH) resource configuration for a Message A (msgA) transmission including a dynamic part of the PUSCH resource configuration for the msgA transmission, the partial PUSCH resource configuration being less than a complete msgA PUSCH resource configuration, the dynamic part of the PUSCH resource configuration comprising a demodulation reference signal (DMRS) configuration;

receive, from the UE, the preamble of msgA; and receive, from the UE, the PUSCH message of msgA according to the PUSCH resource configuration.

14. The base station according to claim 13, wherein the dynamic part of the PUSCH resource configuration comprises one of:

a time domain resource allocation; or a frequency domain resource allocation.

* * * * *